(12) United States Patent
Carrier et al.

(10) Patent No.: US 11,766,003 B2
(45) Date of Patent: Sep. 26, 2023

(54) EXCAVATING ASSEMBLY AND TREE FELLING HEAD INCLUDING SAME

(71) Applicant: INDUSTRIES FORESTIERES PRO PAC LTEE., Saint-Come-Liniere (CA)

(72) Inventors: Dave Carrier, Jackman, ME (US); Patrick Lachance, Saint-Gedeon-de-Beauce (CA)

(73) Assignee: Capital D'Investissement Carrier Inc.

( * ) Notice: Subject to any disclaimer, the term of this patent is extended or adjusted under 35 U.S.C. 154(b) by 566 days.

(21) Appl. No.: 16/875,102

(22) Filed: May 15, 2020

(65) Prior Publication Data

US 2021/0235627 A1 Aug. 5, 2021

Related U.S. Application Data

(60) Provisional application No. 62/969,950, filed on Feb. 4, 2020.

(51) Int. Cl.
*A01G 23/081* (2006.01)

(52) U.S. Cl.
CPC .................................. *A01G 23/081* (2013.01)

(58) Field of Classification Search
CPC .... A01G 23/08; A01G 23/081; A01G 23/083; A01G 23/091; A01G 23/093
See application file for complete search history.

(56) References Cited

U.S. PATENT DOCUMENTS

| | | | | |
|---|---|---|---|---|
| 5,408,814 A | * | 4/1995 | Milbourn | A01G 23/093 144/34.1 |
| 5,423,137 A | * | 6/1995 | Cochran | E02F 3/241 404/90 |
| 6,490,816 B2 | * | 12/2002 | Ketting | E02F 9/2858 172/753 |
| 6,668,880 B2 | * | 12/2003 | Nordstrom | A01G 23/08 144/34.1 |
| 7,114,272 B2 | * | 10/2006 | Clendenning | E02F 9/2858 37/450 |
| 7,694,443 B2 | * | 4/2010 | Gabela | E02F 9/2858 299/108 |
| 7,926,207 B2 | * | 4/2011 | Lopez Almendros | E02F 9/2825 37/456 |
| 9,649,704 B2 | * | 5/2017 | DiSabatino | B23D 59/006 |
| 10,745,890 B2 | * | 8/2020 | Cleophas | E02F 9/2866 |

FOREIGN PATENT DOCUMENTS

CA 2724507 A1 6/2011

* cited by examiner

*Primary Examiner* — Matthew Katcoff
(74) *Attorney, Agent, or Firm* — Smith Keane LLP

(57) ABSTRACT

The present disclosure concerns a tree felling head for mounting to a tree-cutting carrier, the tree felling head comprising a bottom saw housing defining a saw-receiving cavity and comprising a peripheral border at least partially bordering the saw-receiving cavity; and an excavating assembly comprising a scraping portion extending outwardly past the peripheral border at least along a section thereof. It also concerns such an excavating assembly.

20 Claims, 24 Drawing Sheets

EXCAVATING ASSEMBLY AND TREE FELLING HEAD INCLUDING SAME

PRIOR APPLICATION

The present application claims priority from U.S. provisional patent application No. 62/969,950, filed on Feb. 4, 2020, and entitled "TREE FELLING HEAD WITH EXCAVATING ASSEMBLY", the disclosure of which being hereby incorporated by reference in its entirety.

TECHNICAL FIELD

The technical field relates to a tree harvesting machine and, more particularly, to a tree felling head mountable to a tree cutting carrier. It also relates to an excavating assembly mountable to a tree felling head, to a tree felling head comprising an excavating assembly and to a method for at least one of ground excavation and slope escalation with a tree felling head.

BACKGROUND

Tree felling heads, mounted to an end of a hydraulic crane or manipulator arm of a tractor or tracked vehicle or tree-cutting carrier, are used to restrain, cut, and manipulate trees. Tilting felling heads are well-suited for manipulating the cut trees since they provide greater maneuverability and increase the productivity potential. The tilting felling heads might also be used to dig in the vicinity of the trees to be restrained, cut and manipulated, or to remove smaller trees, rocks or any other obstacle surrounding or proximate the trees. Moreover, the tilting felling heads might also be used to help displacement of the tree-cutting carrier, for instance on a slope, by forming steps thereinto. However, the use of tilting felling heads for such excavation, clearing operations or climbing operations tend to damage the tree felling heads.

There is thus a need for a tree felling head which could sustainably perform excavation and/or cleaning operations and/or ease the displacement of the tree-cutting carrier, especially on sloping grounds.

BRIEF SUMMARY

It is therefore an aim of the present invention to address the above-mentioned issues.

According to a general aspect, there is provided a tree felling head for mounting to a tree-cutting carrier, the tree felling head comprising: a bottom saw housing defining a saw-receiving cavity and comprising a peripheral border at least partially bordering the saw-receiving cavity; and an excavating assembly comprising a scraping portion extending outwardly past the peripheral border at least along a section thereof.

According to another general aspect, there is provided a tree felling head for mounting to a tree-cutting carrier, the tree felling head comprising: a bottom saw housing defining a saw-receiving cavity and comprising a peripheral border at least partially bordering the saw-receiving cavity; and an excavating assembly comprising a scraping portion protruding outwardly from the peripheral border of the bottom saw housing.

According to another general aspect, there is provided a tree-cutting carrier, comprising a manipulator arm; and a tree felling head according to the present disclosure, the tree feeling head being mounted to the manipulator arm.

According to another general aspect, there is provided an excavating assembly for a tree felling head having a bottom saw housing defining a saw-receiving cavity and comprising a peripheral border at least partially bordering the saw-receiving cavity, the excavating assembly being securable to the bottom saw housing and comprising a scraping portion protruding outwardly from the peripheral border of the bottom saw housing when the excavating assembly is mounted to the bottom saw housing.

According to another general aspect, there is provided a felling head for mounting to a tree-cutting carrier, the felling head comprising a bottom saw housing defining a saw-receiving cavity and comprising an outer surface and a ground adjacent edge; and an excavating assembly removably mounted to the bottom saw housing, the excavating assembly having a mounting portion superposed to the outer surface of the bottom saw housing and a scraping portion extending outwardly past the ground adjacent edge at least along a section thereof.

According to another general aspect, there is provided a felling head for mounting to a tree-cutting carrier, the felling head comprising a bottom saw housing defining a saw-receiving cavity and comprising an outer surface and a lower blade guard; and an excavating assembly removably mounted to the bottom saw housing and having a scraping portion extending proud of the lower blade guard.

According to another general aspect, there is provided an excavating assembly for a felling head having a bottom saw housing comprising an outer surface and a lower blade guard, the excavating assembly comprising an excavating assembly-mounting portion removably mounted to the bottom saw housing and superposed to the outer surface of the bottom saw housing; and a scraping portion extending from the excavating assembly-mounting portion and proud of the lower blade guard of the bottom saw housing when mounted thereto.

According to another general aspect, there is provided a tree-cutting carrier, comprising: a manipulator arm; and a felling head mounted to the manipulator arm, the felling head comprising: a bottom saw housing defining a saw-receiving cavity and comprising an outer surface and a ground adjacent edge; and an excavating assembly removably mounted to the bottom saw housing and having an excavating assembly-mounting portion superposed to the outer surface of the bottom saw housing and a scraping portion extending outwardly past the ground adjacent edge at least along a section thereof.

According to another general aspect, there is provided a method for excavating a ground with a felling head, comprising: mounting a felling head to a tree-cutting carrier, the felling head comprising a bottom saw housing defining a saw-receiving cavity and comprising an outer surface and a ground adjacent edge; removably mounting an excavating assembly to the bottom saw housing with an excavating assembly-mounting portion of the excavating assembly being superposed to the outer surface of the bottom saw housing so that a scraping portion of the excavating assembly extends outwardly past the ground adjacent edge at least along a section thereof; and swinging the felling head for the excavating assembly to scrape the ground.

DETAILED DESCRIPTION

Figure 1:
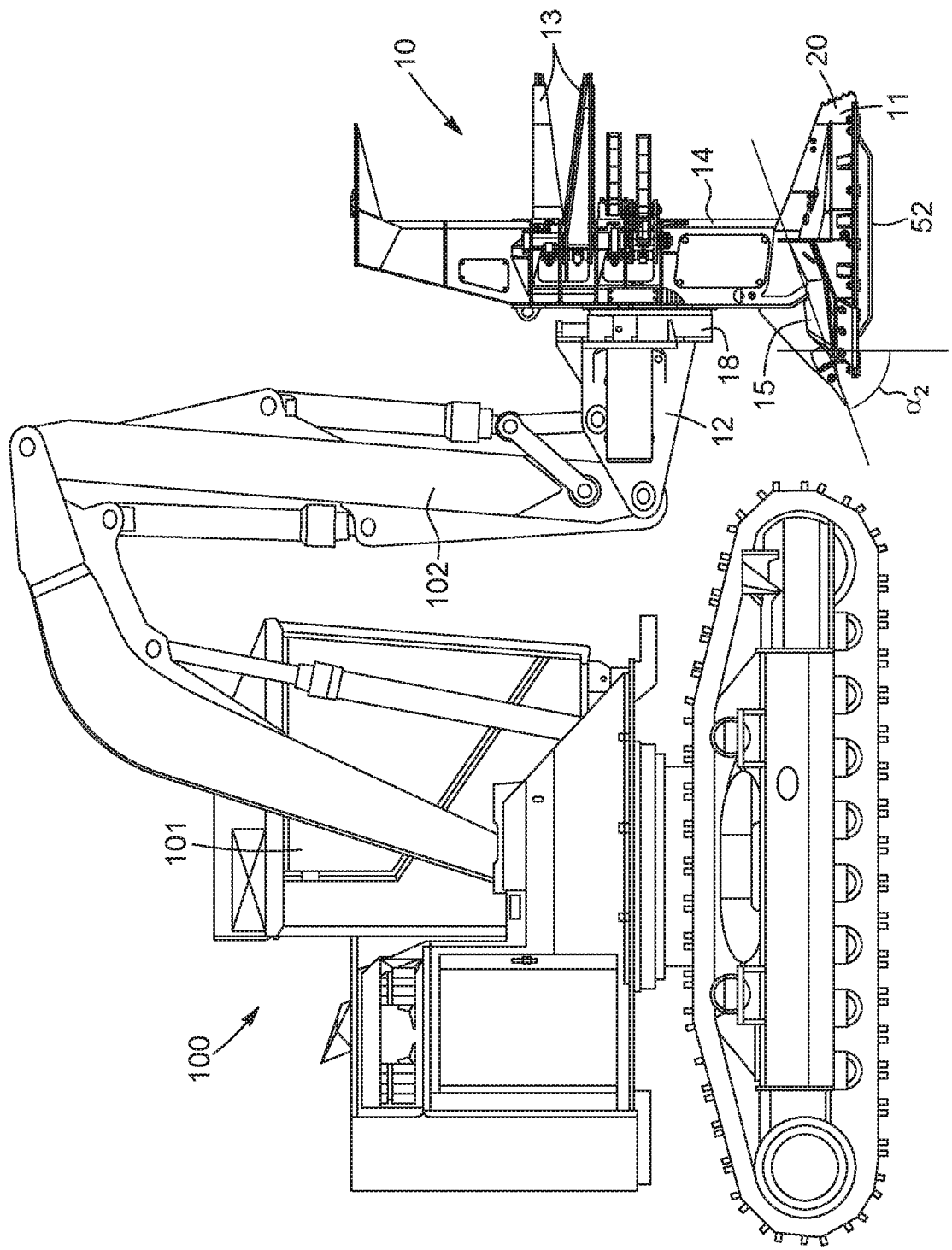
FIG. 1 is a side elevational view of a tree-cutting carrier with a tree felling head in accordance with a first embodiment mounted to a manipulator arm thereof.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the tree felling head and/or the excavating assembly and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Referring to FIGS. 1 to 5, there is shown a tree felling head 10—or felling head 10—in accordance with a first embodiment, adapted to grip, cut and manipulate trees and designed for tilting and rotation movements. The tree felling head 10 includes a tilting holder 12 mountable, for instance removably, to a manipulator arm 102 of a tree-cutting carrier 100, or other such adapted vehicle. The tiling holder 12 is securable to an end of the manipulator arm 102.

The tree felling head 10 also includes a substantially vertically-extending frame 14 having a longitudinal axis to a lower end of which is mounted a saw blade disk 9 for cutting trees and one or more tree-manipulating arms 13. The frame 14 is secured to the tilting holder 12 through a gear assembly 18.

As represented in FIGS. 1 to 5, the tree felling head 10 in accordance with the present disclosure comprises a bottom saw housing 20 defining a saw-receiving cavity 22 shaped and designed to receive the above-mentioned saw blade disk 9. It is thus understood that the bottom saw housing 20 is mounted to the lower end of the vertically extending frame 14. The bottom saw housing 20 comprises an outer surface 24 (with respect to the saw-receiving cavity 22) and a ground adjacent edge 26 (or peripheral border 26). The peripheral border 26 at least partially borders (or delimits) the saw-receiving cavity 22 (at least a lower portion thereof).

The tree felling head 10 further comprises an excavating assembly 200 comprising one or more scraping portions 204 extending outwardly (with respect to the saw-receiving cavity 22) past the peripheral border 26 at least along a section thereof. In other words, as detailed below, the scraping portions 204 of the excavating assembly 200 protrude outwardly from the peripheral border 26 of the bottom saw housing 20. In the embodiment shown, the excavating assembly 200 is removably (or detachably) mounted to the bottom saw housing 20 via one or more housing-mounting portions 202 at least partially secured (in a detachable manner, in the embodiment shown) to the outer surface 24 of the bottom saw housing 20.

In the present description, the adjective "superposed" should be understood as meaning that the relevant element is placed or laid over or above the relevant portion (a section of the outer surface of the bottom saw housing, for instance) whether in or not in contact.

In the present disclosure, unless otherwise stated, the terms outwardly and downwardly (or outward and downward) should be understood with respect to the saw-receiving cavity 22 of the bottom saw housing 20 of the tree felling head 10 when mounted to the tree-cutting carrier 100 and when extending substantially vertically. In other words, in the embodiment shown wherein the excavation assembly 200 is arranged at a rear portion of the bottom saw housing 20, the scraping portions 204 extends towards a vehicle cabin 101 of the tree-cutting carrier 100 when mounted to the manipulator arm 102. As detailed below, the excavating assembly 200 is thus configured to protect the felling head 10—and more particularly the peripheral border 26 of the bottom saw housing 20 thereof—when used for excavation and/or clearing operations and/or climbing operations.

In the following description, the term "excavating" should not be limitedly understood as meaning forming a cavity or a hole in a ground surface surrounding the felling head, but can also designate the action of using the felling head to remove or displace objects, such as rocks, small trees and the like in the vicinity of the felling head. It can also be understood as meaning forming substantially step-shaped excavations into a sloping ground, so as to ease the displacement of the tree-cutting carrier 100 thereon.

The different components of the tree felling head 10 will now be described in more details.

In the embodiment shown, the bottom saw housing 20 of the tree felling head 10 comprises a top wall 28, side walls 30 (or a peripheral side wall 30) and a lower blade guard 32, the side walls 30 (or the peripheral side wall 30) extending between the top wall 28 and the lower blade guard 32. Unless otherwise stated, the outer surface 24 equally refers to the outer surface of the bottom saw housing 20, or the top wall 28 and/or the peripheral side wall 30 thereof. For instance, the top wall 28 and the side walls 30 are welded to each other whereas the lower blade guard 32 is bolted to a lower end portion 31 of the side walls 30. It is appreciated that other suitable mechanical fasteners could also be used to connect the lower blade guard 32, the side walls 30 and/or the top wall 28.

Figure 4:
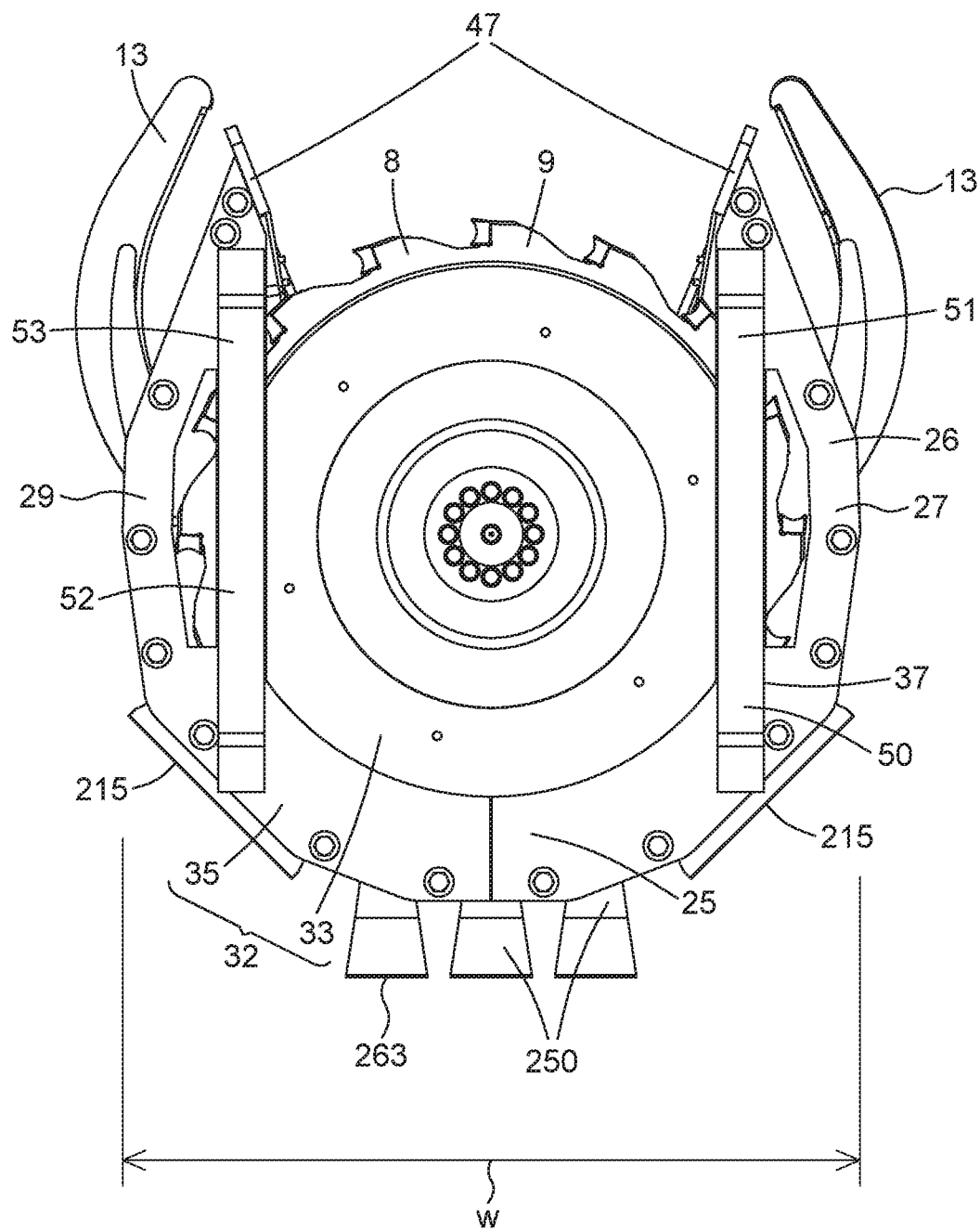
FIG. 4 is a bottom elevational view of the tree felling head of FIG. 1.
Figure 5:
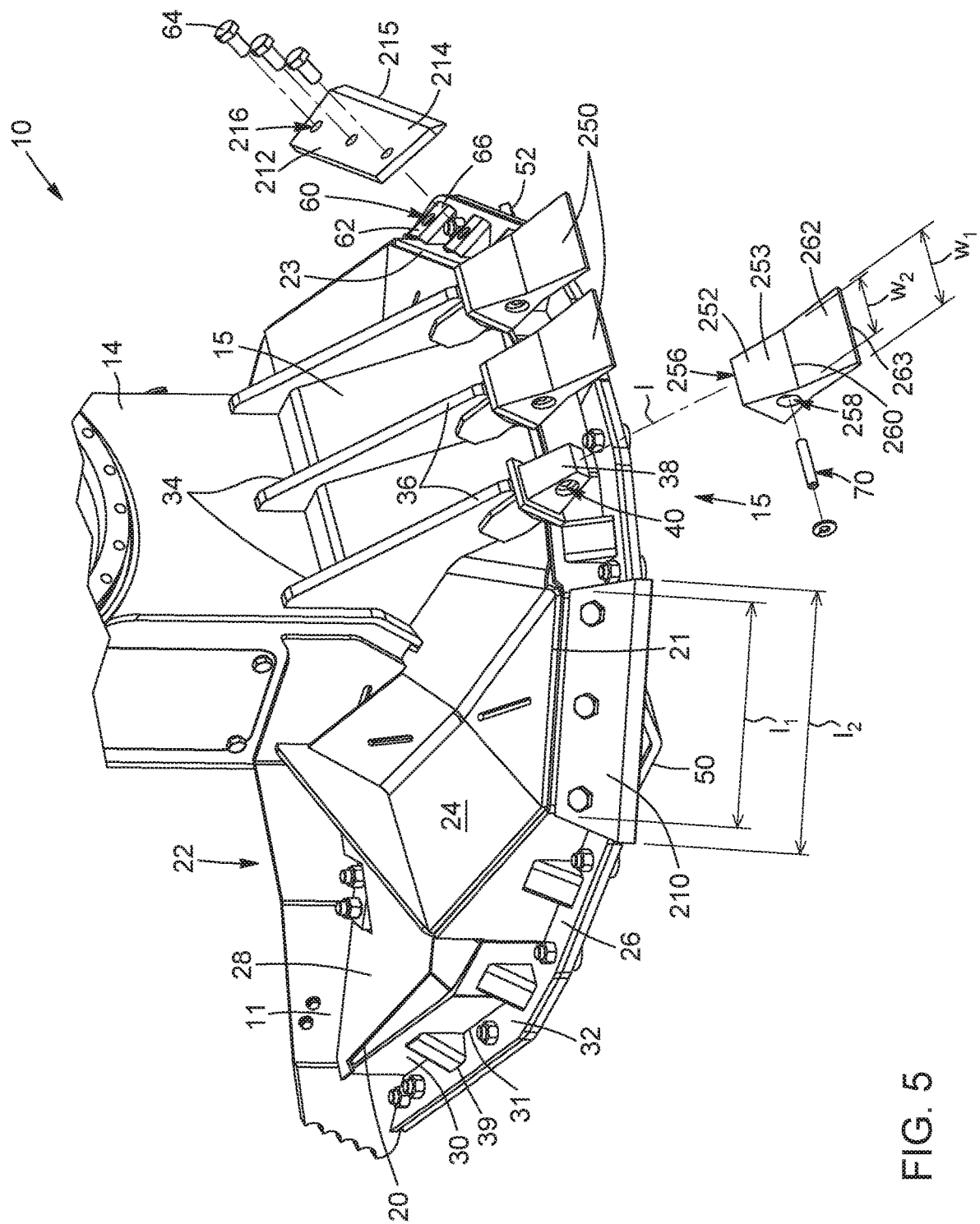
FIG. 5 is a rear perspective view, partially exploded, of the tree felling head of FIG. 1.

In the embodiment shown, the lower blade guard 32 comprises a substantially annular-shaped central member 33 and a peripheral member 35 surrounding partially the central member 33. As best shown in FIG. 4, the peripheral member 35 of the lower blade guard 32 is substantially U-shaped and has front portions 47 extending outwardly past a front-end portion 8 of the saw blade disk 9 (i.e. away from the tree-cutting carrier when the equipped tree felling head 10 is mounted thereto). It could also be conceived a one-pieced lower blade guard or a lower blade guard having any other shape.

It is appreciated that the shape, the configuration, and the relative location of the top wall 28, the side walls 30 and the lower blade guard 32 can vary from the embodiment shown.

For instance, the lower blade guard 32 defines a plane extending substantially horizontally when the frame 14 of the felling head 10 stands in a substantially vertical orientation.

It is understood that the above-mentioned saw blade disk 9 is at least partially contained in the bottom saw housing 20, except at a front portion 11 of the bottom saw housing 20 where teeth of the front end portion 8 of the saw blade disk 9 are exposed for cutting.

In the embodiment shown, the peripheral border 26 of the bottom saw housing 20 is at least partially formed by the lower blade guard 32, and more particularly is at least partially formed by a portion of the lower blade guard 32 protruding outwardly and substantially transversally (for instance substantially horizontally), in the embodiment shown, from the peripheral side wall 30. It is thus understood that, in the embodiment shown, the peripheral border 26 of the bottom saw housing 20 is substantially U-shape (or substantially horse-shoe shape) with an opening located at the front portion 11 of the bottom saw housing 20. In other words, in the embodiment shown, the peripheral border 26 (or ground adjacent edge 26) has a substantially circular arc shape. It is thus understood that the peripheral border 26 comprises opposed lateral sections 27, 29 and a rear section 25 extending therebetween.

In the embodiment shown, the tree felling head 10 further comprises a plurality of upwardly extending flanges 34 (or tooth-mounting flanges 34) (three, in the embodiment shown) extending substantially vertically in the embodiment shown at a rear portion 15 of the bottom saw housing 20. The tooth-mounting flanges 34 protrude outwardly from the outer surface 24 of the bottom saw housing 20. The upwardly extending flanges 34 are secured to and protrude from the outer surface 24 of the bottom saw housing 20 and comprise a free lower end 36 (or free rear end 36). The felling head 10 further comprises mounting heads 38 (FIG. 5) (or tooth-mounting protrusion, or tooth-mounting pad, or tooth-mounting heads) extending at least one of outwardly and downwardly from the rear free ends 36 of the upwardly extending tooth-mounting flanges 34. More particularly, the tooth-mounting heads 38 (or tooth-mounting pads 38) protrude outwardly (considered with respect to the saw-receiving cavity 22) and substantially downwardly from the upwardly extending flanges 34. In the embodiment shown, the mounting heads 38 have a substantially frusto-pyramidal shape and have a fastener-receiving opening 40 formed therein, which extends for instance substantially horizontally. The function of the tooth-mounting heads 38 (or tooth-mounting pads) will be better understood at the description of the excavating assembly 200.

It is appreciated that the shape, the number, the configuration, and the location of the upwardly extending tooth-mounting flanges 34, as well as the shape, the number, the configuration, and the location of the tooth-mounting pads 38 can vary from the embodiment shown.

The felling head 10 further comprises two ground-contacting skis 50, 52 mounted (for instance welded) to a lower surface 37 of the lower blade guard 32 (extending downwardly therefrom), downwardly from a lower surface of the peripheral member 35 of the lower blade guard 32, in the embodiment shown. In the embodiment shown, the ground-contacting skis 50, 52 are substantially parallel to each other and extend substantially horizontally between the rear portion 15 and the front portion 11 of the bottom saw housing 20. In the embodiment shown, considered along a substantially horizontal orientation, the ground-contacting skis 50, 52 extend between the opposed lateral sections 27, 29 of the ground adjacent edge 26 (or peripheral border 26). Moreover, considered along a substantially vertical orientation, the ground-contacting skis 50, 52 extend below the ground adjacent edge 26 and comprise a ground-contacting surface 51, 53, so that when the tree felling head 10 is displaced downwardly along a vertical orientation, the ground-contacting skis 50, 52 (and more particularly the ground-contacting surfaces 51, 53 thereof) are the first elements of the tree felling head 10 to contact a ground surface and can thus be used to support the tree felling head 10 on the ground surface while limiting the risk of damaging the bottom saw housing 20 and the saw blade disk 9 contained in the saw-receiving cavity 22 thereof. It is appreciated that the shape, the configuration, the number and the location of the ground-contacting skis 50, 52 can vary from the embodiment shown.

Excavating Assembly

As mentioned above, the excavating assembly 200 according to the present disclosure is configured to extend outwardly past the ground adjacent edge 26 (or peripheral border 26) at least along a section thereof. Said differently, the excavating assembly 200 is shaped and dimensioned to extend proud of the peripheral border 26 at least partially formed by the lower blade guard 32. In yet otherwords, the excavating assembly 200 is shaped and dimensioned so that a free end of the scraping portion 204 thereof protrudes at least one of outwardly and downwardly from the peripheral border 26 of the bottom saw housing 20.

In the first embodiment shown in FIGS. 1 to 5, the excavating assembly 200 comprises one or more scraper blades 210 (or excavating blades 210) (two in the embodiment shown) and scraper teeth 250 (or excavating teeth 250) (three in the embodiment shown). For instance and without being limitative, as represented in particular in FIG. 3, the bottom saw housing 20 has a substantially vertical median plane P, the plurality of excavating blades 210 and excavating teeth 250 being arranged substantially symmetrically with respect to the substantially vertical median plane P.

In the first embodiment shown, the bottom saw housing 20 has left and right rear corners 21, 23 provided on a respective side of the vertical median plane P, the excavating assembly 200 comprises two scraper blades 210 (or excavating blades 210) at least partially superposed to the outer surface of the left and right rear corners 21, 23. The excavating assembly 200 further comprises scraper teeth 250 (or excavating teeth 250) at the rear portion 15 of the bottom saw housing 20, between the two scraper blades 210 (or excavating blades 210 or left and right excavating blades 210). It is appreciated that the shape, the number and the location of the excavating teeth 250 and the excavating blades 210 can vary from the embodiment shown. The felling head 10 might comprise additional excavating teeth 250 and/or additional excavating blades 210, for instance at least partially superposed to the outer surface 24 of the bottom saw housing 20 at side portions thereof.

Excavating Blade (Scraper Blade)

In the shown embodiment, the excavating blades 210 have a substantially similar shape, so that the following description of one of the excavating blades 210 will apply to any of them. It could however be conceived an excavating assembly 200 having excavating blades of different shapes and/or dimensions.

The excavating blade 210 is shaped and dimensioned to cover a section of the peripheral side wall 30 (a section of the outer surface thereof). The excavating blade 210 comprises a blade-mounting portion 212 (or proximal end portion or housing-mounting portion 212) at an upper portion thereof, forming at least partially the housing-mounting portion 202 of the excavating assembly 200. The excavating blade 210 further comprises a scraping portion 214 at a lower portion thereof mounted, in a detachable manner, in the embodiment shown, to the bottom saw housing 20 via the housing-mounting portion 212. The scraping portion 214 of the excavating blade 210 at least partially forms the scraping portion 204 of the excavating assembly 200. For instance and without being limitative, the housing-mounting portion 212 of the excavating blade 210 is at least partially secured to the outer surface 24 of the bottom saw housing 20 while the scraping portion 214 of the excavating blade 210 at least partially extends proud of a section of the peripheral border 26 at least partially formed by the lower blade guard 32 of the bottom saw housing 20 when arranged thereon (i.e. mounted thereto). The scraping portion 214 is also designed to extend proud of the section of the peripheral border 26 and to protrude at least one of outwardly and downwardly from the peripheral border 26 of the bottom saw housing 20 (to protrude both outwardly i.e. toward the vehicle cabin 101 and downwardly from the peripheral border 26 of the bottom saw housing 20 in the embodiment shown).

In the embodiment shown, housing-mounting holes 216 or felling head-mounting holes 216 (for instance three horizontally aligned mounting holes) are formed in the housing-mounting portion 212 to mount the scraper blade 210 (or excavating blade 210) to the bottom saw housing 20. In the embodiment shown, the excavating blade 210 is detachably mountable (i.e. securable) to the bottom saw housing 20. In the embodiment shown, the housing-mounting holes 216 are in register with fastener-receiving apertures 60 formed in blade-mounting brackets 62 (FIG. 5) protruding outwardly from the peripheral side wall 30 and/or to an upper face 39 (forming at least partially the outer surface 24 of the bottom saw housing 20) of the lower blade guard 32. A mechanical fastener 64 (such as a screw or a bolt) is configured to be engaged into the housing-mounting hole 216 and into the fastener-receiving aperture 60 to secure the scraper blade 210 to the bottom saw housing 20, in a detachable manner, in the embodiment shown. In the embodiment shown, the blade-mounting brackets 62 have a blade-receiving surface 66 in which the fastener receiving aperture 60 is formed, so that the excavating blade 210 (the housing-mounting portion 212 thereof) is at least partially superposable (or securable or mountable) onto the blade-receiving surface 66. It is appreciated that the shape, the number, the configuration, and the location of the blade-mounting holes 216 can vary from the embodiment shown. It is also appreciated that the shape, the number, the configuration, and the location of the blade-mounting brackets 62 can vary from the embodiment shown. Moreover, any other mechanical fastening could be conceived. It is also appreciated that the scraper blade 210 could be securable (for instance detachably) to any other suitable component or portion of the bottom saw housing 20.

The blade-receiving surface 66 of the mounting brackets 62 is inclined with respect to vertical so that, once mounted thereto (or at least partially superposed thereto), the excavating blade 210 defines a blade inclination angle α1 (FIG. 2) with respect to vertical. In other words, the scraping portion 212 of the excavating blade 210 has an inner surface (considered with respect to the saw-receiving cavity 22), the inner surface of the scraping portion 212 defining the blade inclination angle α1. In yet other words, the inner surface of the scraping portion 212 defines the blade inclination angle with the longitudinal axis of the vertically extending frame 14 of the tree felling head 10. In some embodiments, the blade inclination angle α1 of the scraper blade 210 with respect to vertical is acute. In some embodiments, the inclination angle α1 of the scraper blade 210 with respect to vertical is comprised between about 10° and about 80°. In some other embodiments, the inclination angle α1 of the scraper blade 210 with respect to vertical is comprised between about 20° and about 70°. In some other embodiments, the inclination angle α1 of the scraper blade 210 with respect to vertical is comprised between about 30° and about 60°. In yet some other embodiments, the inclination angle α1 of the scraper blade 210 with respect to vertical is about 45°.

In the embodiment shown, the scraper blade 210 is substantially trapezoidal. In other words, in the embodiment shown, the excavating blade 210 diverges towards the distal end portion 214 (or scraping portion 214 or free end portion 214 thereof). In yet other words, the scraper blade 210 defines a longitudinal direction, a length 11 of the housing-mounting portion 212 considered along the longitudinal direction being smaller than a length 12 of the scraping portion 214.

In the embodiment shown, the scraper blade 210 is tapered with a thickness decreasing towards the scraping portion 214 (i.e. towards the free end portion 214 thereof). For instance, the housing-mounting portion 212 has a constant thickness, wherein the scraping portion 214 is tapered with a thickness decreasing towards a free end 215 (or lower edge 215 or scraping edge 215) of the scraping portion 214. For instance, the scraping portion 214 is beveled. In other words, the excavating blade 210 comprises a sharp lower edge (or scraping edge or sharp free end) that is shaped and designed to ease the digging, excavating and/or cleaning operations carried out by the tree felling head 10 with the excavating assembly 200 mounted thereto.

Figure 3:
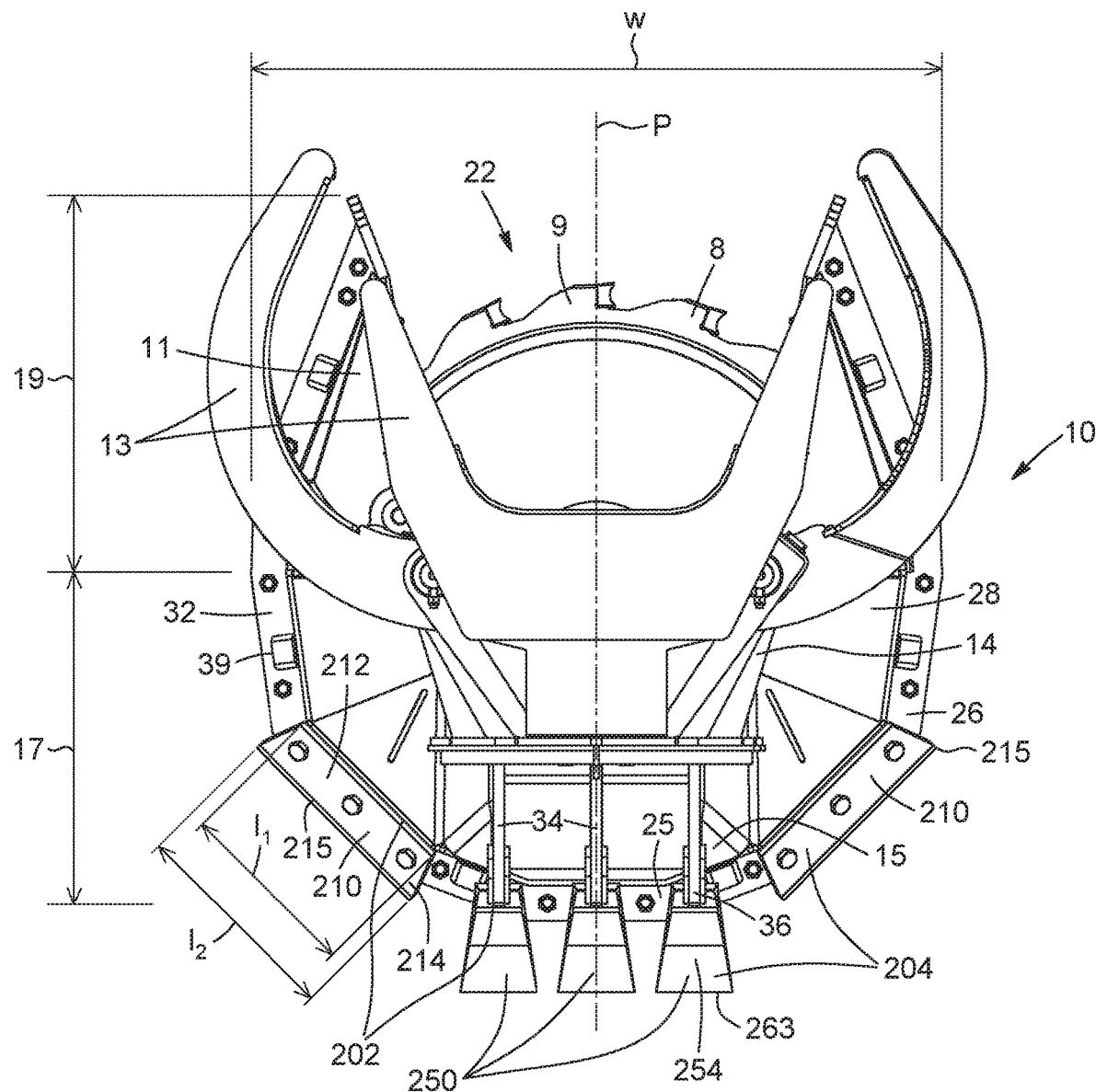
FIG. 3 is top elevational view of the tree felling head of FIG. 1.

As represented in FIG. 3, the bottom saw housing 20 has a width W. It is understood that the width W of the bottom saw housing 20 is defined by the peripheral border 26 thereof. The length 12 of the scraping portion 214 is at least about 10% of the width W of the bottom saw housing 20. In some other embodiments, the length 12 of the scraping portion 214 is at least about 20% of the width W of the bottom saw housing 20. In some other embodiments, the length 12 of the scraping portion 214 is at least about 30% of the width W of the bottom saw housing 20.

It is appreciated that the shape, the configuration, the number and the location of the excavating blades 210 can vary from the embodiment shown.

It is thus understood that in the present description, a blade (excavating blade) usually designates a substantially flat element and should be understood as an element extending along a length, the free end of the scraping portion of the excavating blade extending at least along a portion of the length.

Excavating Teeth/Scraper Teeth

In the shown embodiment, the scraper teeth 250 (or excavating teeth 250) have a similar shape, so that the following description of one of the scraper teeth 250 will apply to any of them. It could however be conceived an excavating assembly 200 having scraper teeth of different shapes and/or dimensions.

The scraper tooth 250 comprises a tooth-fastening portion 252 (or proximal end portion, or housing-fastening portion, or felling head-fastening portion, or housing-mounting portion 252) at an upper portion thereof. The housing-mounting portion 252 of the scraper tooth 250 forms at least partially the housing-mounting portion 202 of the excavating assembly 200. The scraping tooth 250 (or excavating tooth 250) further comprises a scraping portion 254 (or free end portion) at a lower portion thereof mounted to the bottom saw housing 20 via the housing-fastening portion 252. The scraping portion 254 of the excavating tooth 250 at least partially forms the scraping portion 204 of the excavating assembly 200. The housing-fastening portion 252 of the scraper tooth 250 is at least partially superposed to the outer surface 24 (or substantially covers the outer surface 24) of the bottom saw housing 20 and the scraping-portion 254 of the scraper tooth 250 extends proud of the peripheral border 26 at least partially formed by the lower blade guard 32 of the bottom saw housing 20 when mounted thereto. The distal end portion 254 (or scraping portion 254) extends proud of a section of the peripheral border 26. In other words, the scraping portion 254 of the excavating tooth 250 extends outwardly past the ground adjacent edge 26 (or peripheral border 26) of the bottom saw housing 20 at least along a portion thereof. In yet other words, the scraping portion 254 of the excavating tooth 250 protrudes at least one of outwardly and downwardly from the peripheral border 26 of the bottom saw housing 20. In other words, in the embodiment shown, wherein the excavating tooth 250 is mounted at the rear portion of the bottom saw housing 20, the scaping portion 254 extends towards the vehicle cabin 101.

In the embodiment shown, the scraping tooth 250 is mountable (i.e. securable) (for instance detachably) to one of the tooth-mounting flanges 34. In the embodiment shown, the housing-fastening portion 252 is engageable with one of the above-described tooth-mounting heads 38 (or tooth-mounting pads 38). For instance, the excavating tooth 250 comprises a housing-fastening sleeve 253 engageable (in a detachable manner, in the embodiment shown) with one of the tooth-mounting pads 38. A pad-receiving cavity 256 (or head-receiving cavity 256) is thus formed in the housing-fastening sleeve 253 that is shaped and dimensioned to at least partially receive the tooth-mounting pad 38. A fastener-receiving through aperture 258 is formed in at least one wall portion of the housing-fastening sleeve 253 delimiting partially the pad-receiving cavity 256. The fastener-receiving through aperture 258 is aligned with the fastener-receiving opening 40 formed in the tooth-mounting pad 38 when the housing-fastening sleeve 253 is engaged with a respective one of the tooth-mounting pads 38. A mechanical fastener 70 (such as a screw, a bolt or any other suitable mechanical fastener) is configured to be engaged into the fastener-receiving through aperture 258 and into the fastener-receiving opening 40 formed in the tooth-mounting pad 38. It is appreciated that the shape, the configuration, and the location of the housing-fastening portion 252 can vary from the embodiment shown. Moreover, any other mechanical fastening could be conceived to mount (for instance in a detachable manner) the excavating tooth 250 to the bottom saw housing 20.

In the embodiment shown, the tooth-mounting pad 38 extends along an orientation inclined with respect to vertical, so that, once mounted thereto (or engaged therewith), the scraper tooth 250 (or excavating tooth) defines an oblique angle with respect to vertical. In other words, the scraping portion 254 of the excavating tooth 250 has an inner surface (considered with respect to the saw-receiving cavity 22) defining a tooth inclination angle α2 (FIG. 1) with vertical. In yet other words, the inner surface of the scraping portion 254 of the excavating tooth 250 defines the tooth inclination angle α2 with the longitudinal axis of the vertically extending frame 14. In some embodiments, the tooth inclination angle α2 of the scraper tooth 250 (or excavating tooth 250) with respect to vertical is acute. In some embodiments, the tooth inclination angle α2 of the scraper tooth 250 with respect to vertical is comprised between about 10° and about 80°. In some other embodiments, the tooth inclination angle α2 of the scraper tooth 250 with respect to vertical is comprised between about 20° and about 70°. In some other embodiments, the tooth inclination angle α2 of the scraper tooth 250 with respect to vertical is comprised between about 30° and about 60°. In yet some other embodiments, the tooth inclination angle α2 of the scraper tooth 250 with respect to vertical is about 45°.

In the embodiment shown, the tooth-fastening portion 252 has a substantially frusto-pyramidal shape corresponding substantially to the shape of the mounting pad 38. In the embodiment shown, the pad-receiving cavity 256 formed in the housing-fastening sleeve 253 has a substantially squared cross-section, an area of the substantially squared cross-section decreasing towards the scraping portion 254.

In the embodiment shown, the scraping portion 254 has a proximal portion 260 adjacent and connected to the housing-fastening portion 252 and an opposed distal portion 262 comprising a free end 263 of the scraping tooth 250. For instance, the scraping portion 254 has a width—considered in a direction perpendicular to a longitudinal direction l of the scraper tooth 250—increasing towards the distal portion 262 (i.e. towards the free end 263 or scraping edge 263 thereof). In other words, the width of the scraping portion 254 decreases towards the housing-mounting portion 252. In the embodiment shown, the width w1 of the free end 263 of the distal portion 262 of the scraper tooth 250 is greater than the width w2 of the proximal portion 260 of the scraping portion 254. In the embodiment shown, the width w1 of the free end 263 of the scraping tooth 250 is smaller than the length 12 of the scraping portion 214 of the excavating blade 210. In some embodiments, the width w1 of the free end 263 of the distal portion 262 of the scraper tooth 250 is smaller than about 50% of the length 12 of the scraping portion 214 of the scraper blade 210. In some other embodiments, the width w1 of the free end 263 of the distal portion 262 of the scraper tooth 250 is smaller than about 40% of the length 12 of the scraping portion 214 of the scraper blade 210. In some other embodiments, the width w1 of the free end 263 of the distal portion 262 of the scraper tooth 250 is smaller than about 30% of the length 12 of the scraping portion 214 of the scraper blade 210.

In the embodiment shown, the scraper tooth 250 (at least the scraping portion 254 thereof) is tapered with a thickness decreasing towards the free end 263 (or scraping edge or lower edge) of the scraping portion 254 (i.e. decreasing along the distal portion 262 away from the proximal portion 260). In other words, the scraping portion 254 of the scraper tooth 250 is substantially beveled. In yet other words, the scraper tooth 250 comprises a sharp outer edge—or sharp distal edge or sharp free edge—that is shaped and designed to ease the digging, excavating and/or cleaning operations carried out by the tree felling head 10 with the excavating assembly 200 mounted thereto (or arranged on the outer surface 24 of the bottom saw housing 20 thereof).

It is appreciated that the shape, the configuration, the number and the location of the scraper teeth 250 (or excavating teeth) can vary from the embodiment shown. It is also appreciated that the shape, the configuration and the location of the scraping portion 254 and the housing-fastening portion 252 (or housing-mounting portion 252) of the scraper tooth 250 can vary from the embodiment shown.

It is thus understood that in the present description, a tooth (excavating tooth) designates a substantially sharp-shaped element and should be understood as an element extending along a length, the free end 263 of the scraping portion 254 being substantially transversal to the length.

Features of the Excavating Assembly

In the embodiment shown, the excavating assembly 200 (i.e. at least one of the excavating blades 210 and/or the excavating teeth 250) is at least partially made of carbide, cast iron, hard steel, heat-treated steel or a combination thereof. For instance, the excavating assembly 200 is at least partially made in a material of greater resistance to abrasion than the material in which the bottom saw housing 20 (for instance the top wall 28, the peripheral side wall 30 and/or at least a portion of the lower blade guard 32 thereof, is at least partially made.

In the embodiment shown, the excavating assembly 200 comprises a plurality of housing-mounting portions 202 comprising the housing-mounting portions 212 of the scraper blades 210 (or excavating blades 210) and the housing-fastening portions 252 of the scraper teeth 250 (or excavating teeth 250). The excavating assembly 200 further comprises a plurality of scraping portions 204 comprising the scraping portions 254 of the scraper teeth 250 and the scraping portions 214 of the scraper blades 210. As detailed above, the scraping portions of the excavating assembly 200 are mountable (i.e. securable) (detachably, in the first embodiment shown) to the bottom saw housing 20 via the housing-mounting portions 202 of the excavating assembly 200. Therefore, one or more of the components (i.e. one or more of the excavating teeth 250 and/or excavating blades 210) of the excavating assembly 200 can be easily replaced when worn. Furthermore, in the embodiment shown, the scraper blades 210 and/or the scraper teeth 250 of the excavating assembly 200 (at least a portion of the housing-mounting portions thereof) are at least partially superposed to the outer surface 24 of the bottom saw housing 20 and extend proud of the peripheral border 26 of the bottom saw housing 20 when mounted thereto. Therefore, the excavating teeth 250 and/or the excavating blades 250 are configured to contact the ground or other elements before the bottom saw housing 20 upon displacement of the tree felling head 10 towards the ground (i.e. before the lower surface 37 of the lower blade guard 32 and/or the peripheral border 26 at least partially formed by the lower blade guard 32, in the embodiment shown).

As detailed above, the scraper blades 210 and the scraper teeth 250 are shaped and dimensioned to protrude at least one of outwardly and downwardly from the peripheral border 26 of the bottom saw housing 20. The ground-contacting skis 50, 52 are arranged so that they extend proud of the excavating assembly 200, considered along a vertical orientation. In other words, in the embodiment shown, the excavating assembly 200 does not prevent the ground-contacting skis 50, 52 (the ground-contacting surface 51, 53 thereof) from being the first elements of the tree felling head 10 to contact the ground surface upon displacing the tree felling head 10 vertically in a downward direction.

As best shown in FIG. 3, the bottom saw housing 20 is dividable into a forward half 19, comprising the front portion 11, and a rearward half 17, comprising the rear portion 15, the saw blade disk 9 being at least partially exposed in the forward half 17 of the bottom saw housing 20. In the embodiment shown, the excavating assembly 200 is arranged at the rearward half 17 of the bottom saw housing 20.

The scraping portions 204 of the excavating assembly 200 comprise free ends, at least partially formed by the free ends 215, 263 of the excavating blades 210 and excavating teeth 250. The free ends of the excavating assembly 200 extend at least one of outwardly (i.e. towards the tree-cutting carrier when the equipped tree felling head 10 is mounted thereto) and downwardly with respect to the section of the ground adjacent edge 26 (or peripheral border 26) past which the scraping portions 204 extend outwardly.

Figure 2:
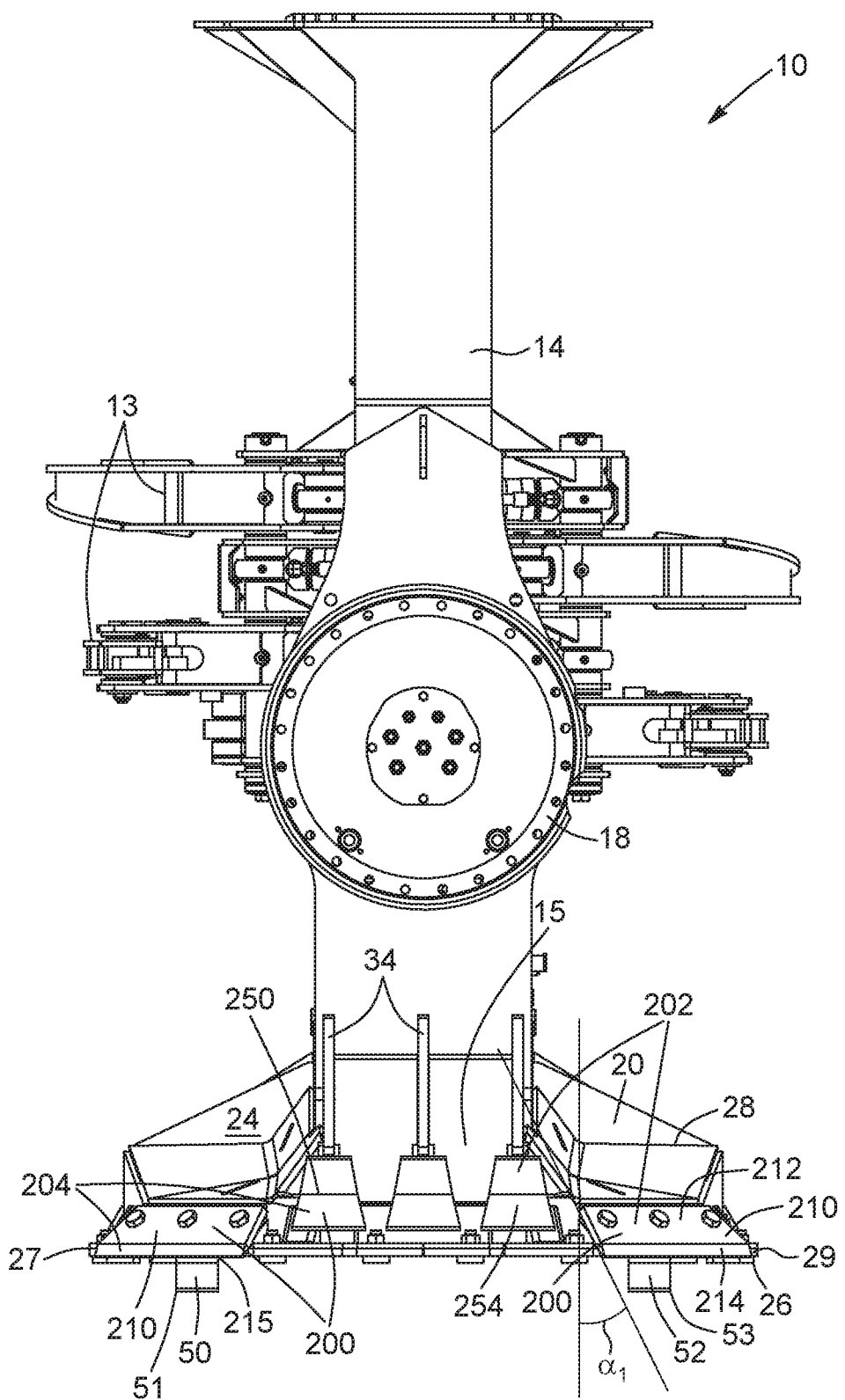
FIG. 2 is a rear elevational view of the tree felling head of FIG. 1, the tree felling head comprising a bottom saw housing and an excavating assembly.

In the embodiment shown, as best shown in FIG. 2, at least some of the free ends 215, 263 of the excavating blades 210 and excavating teeth 250 (i.e. the free ends of the excavating assembly 200) extend above the ground-contacting surfaces 51, 53 of the ground-contacting skis 50, 52. In other words, at least some of the free ends 215, 263 of the excavating blades 210 and excavating teeth 250 are vertically offset with the ground-contacting surfaces 51, 53 of the ground-contacting skis 50, 52. As best shown in FIG. 4, it is understood that when the tree felling head 10 is swung to be displaced along a substantially horizontal orientation (i.e. when the tree felling head 10 is swung side to side), the excavating assembly 200 is shaped, dimensioned and arranged with respect to the bottom saw housing 20 to limit the risk that the ground adjacent edge 26 (or peripheral border 26) of the bottom saw housing 20 contacts obstacles surrounding the tree felling head 10, and to limit the risk of damaging the saw blade disk 9 by such contacts. The tree felling head 10 can thus be used to carry out excavating, digging, cleaning operations and/or climbing operations while limiting the risk of damaging the bottom saw housing 20 and the saw blade disk 9 at least partially contained in the saw-receiving cavity 22 thereof. In other words, the excavating assembly 200 is configured to guard the bottom saw housing 20 of the tree felling head 10 by protecting the ground adjacent edge 26, the lower blade guard 32 (at least the peripheral member 35 thereof), the side walls 30 (or peripheral side wall 30) and/or the top wall 28 of the bottom saw housing 20. Moreover, the scraping portions 204 of the excavating assembly 200 comprise, in the embodiment shown, sharp edges, and are thus shaped and designed to ease the digging, excavating, cleaning operations and/or climbing operations carried out by the tree felling head 10.

Moreover, in the first embodiment shown in which the excavating assembly 200 is removably mountable (i.e. securable) to the tree felling head 10, it can easily be replaced, for instance when it is damaged and/or to mount an excavating assembly 200 of different dimensions, for the tree felling head 10 to be better adapted to its intended use.

It is appreciated that the shape, the configuration, and the location of the excavating assembly 200 with respect to the bottom saw housing 20 of the tree felling head 10 can vary from the embodiment shown.

Second Embodiment of the Excavating Assembly

Figure 6:
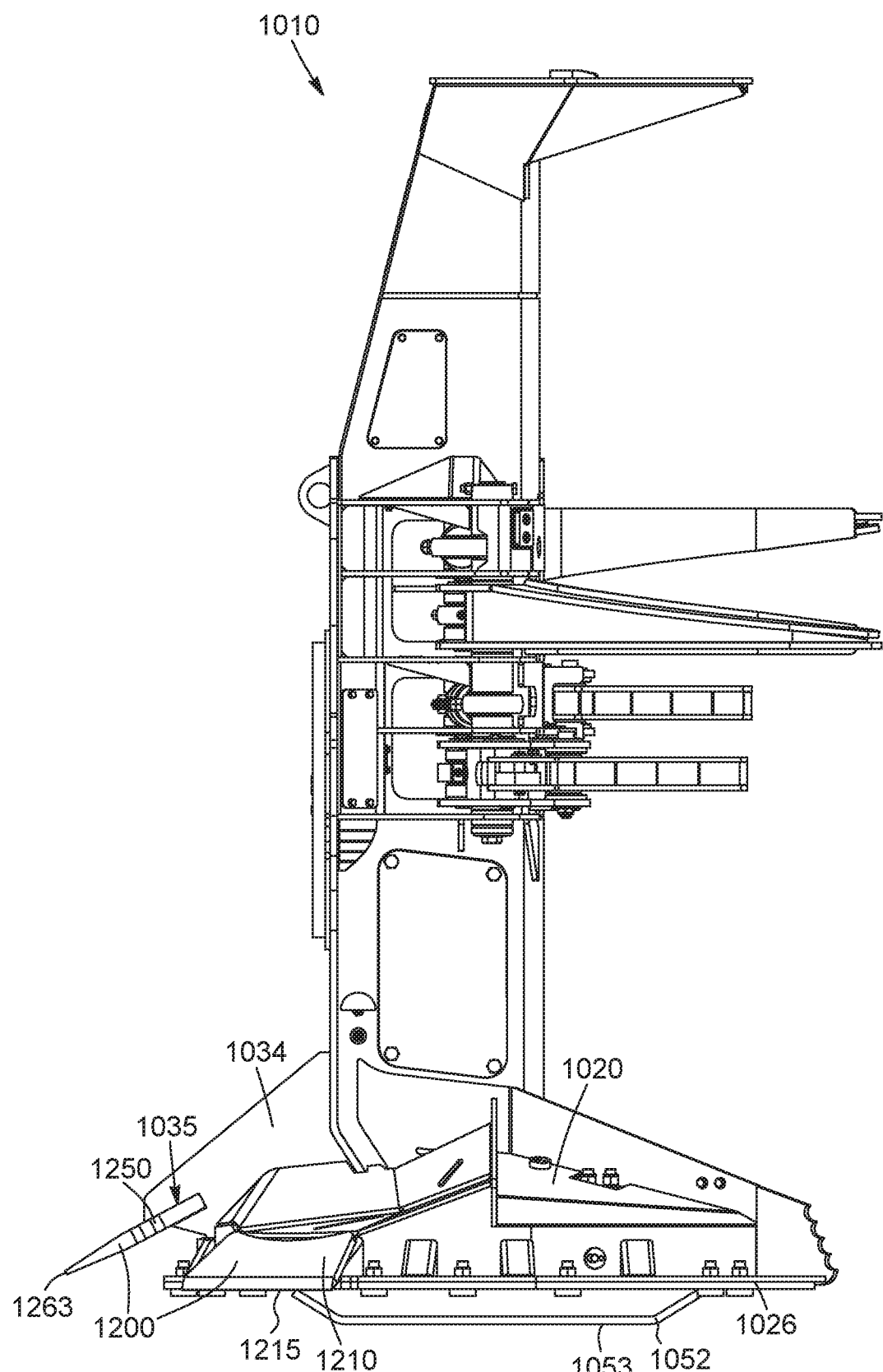
FIG. 6 is a side elevational view of a tree felling head in accordance with a second embodiment.
Figure 7:
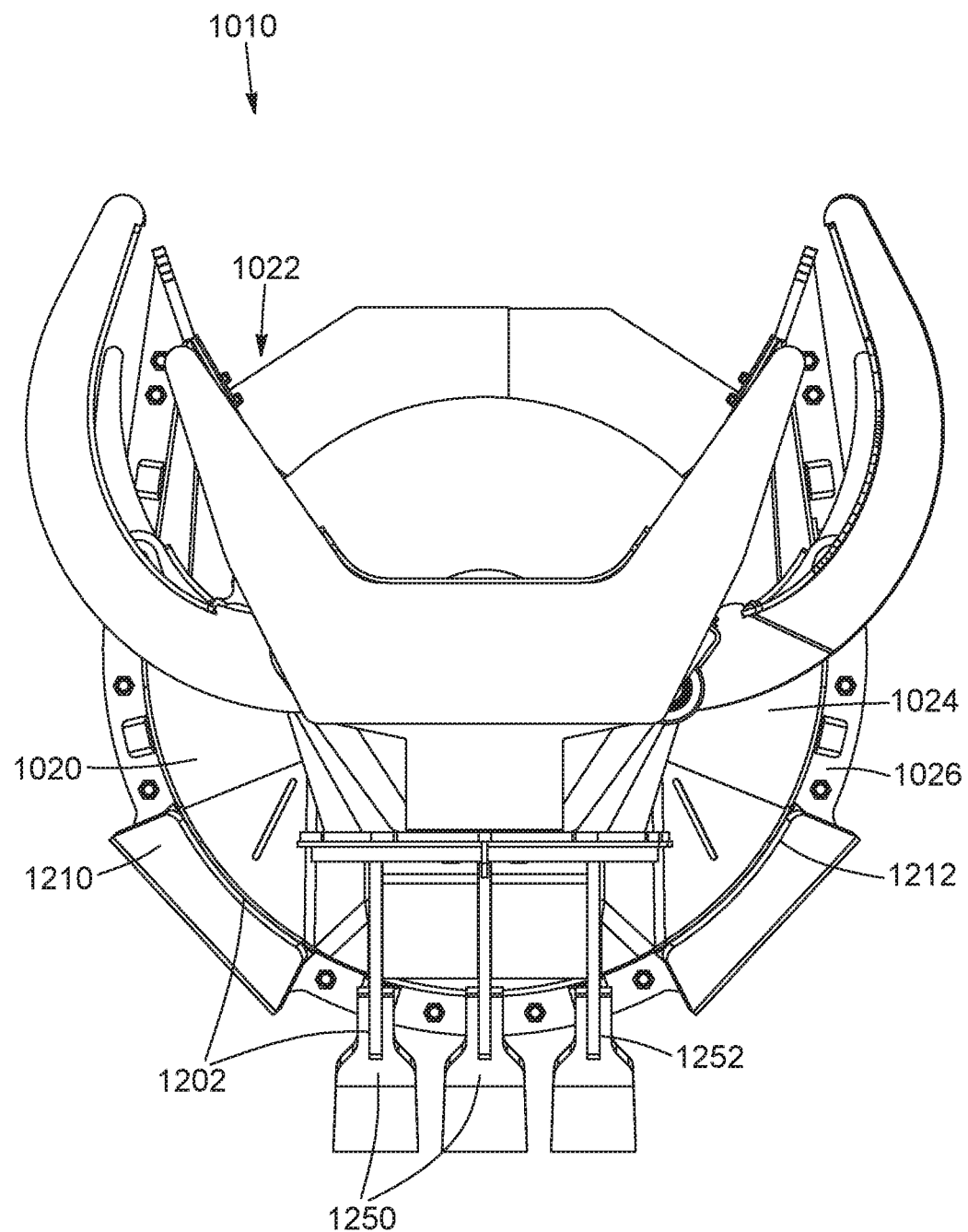
FIG. 7 is a top elevational view of the tree felling head of FIG. 6.
Figure 8:
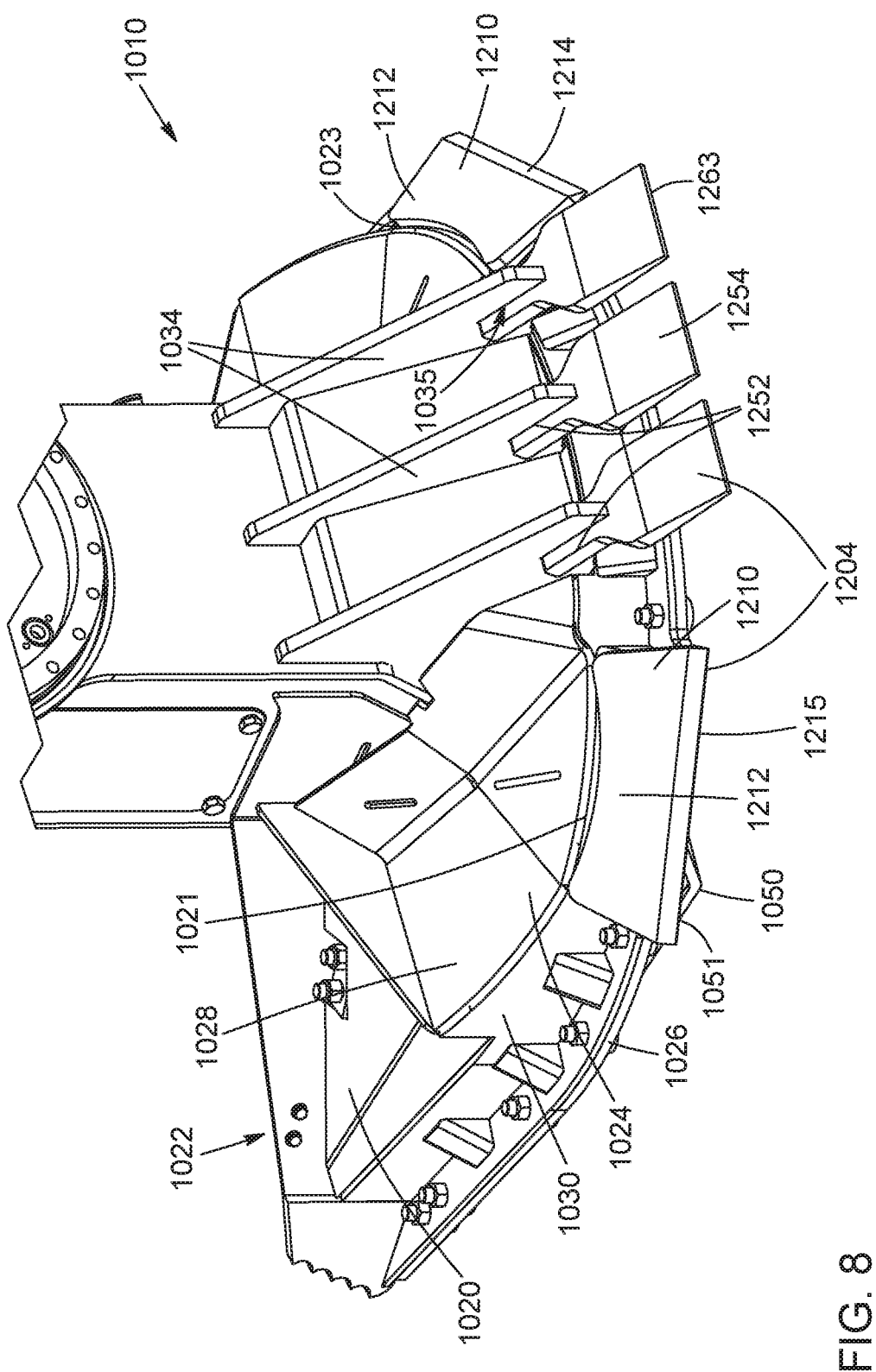
FIG. 8 is a rear perspective view of the tree felling head of FIG. 6.
Figure 9:
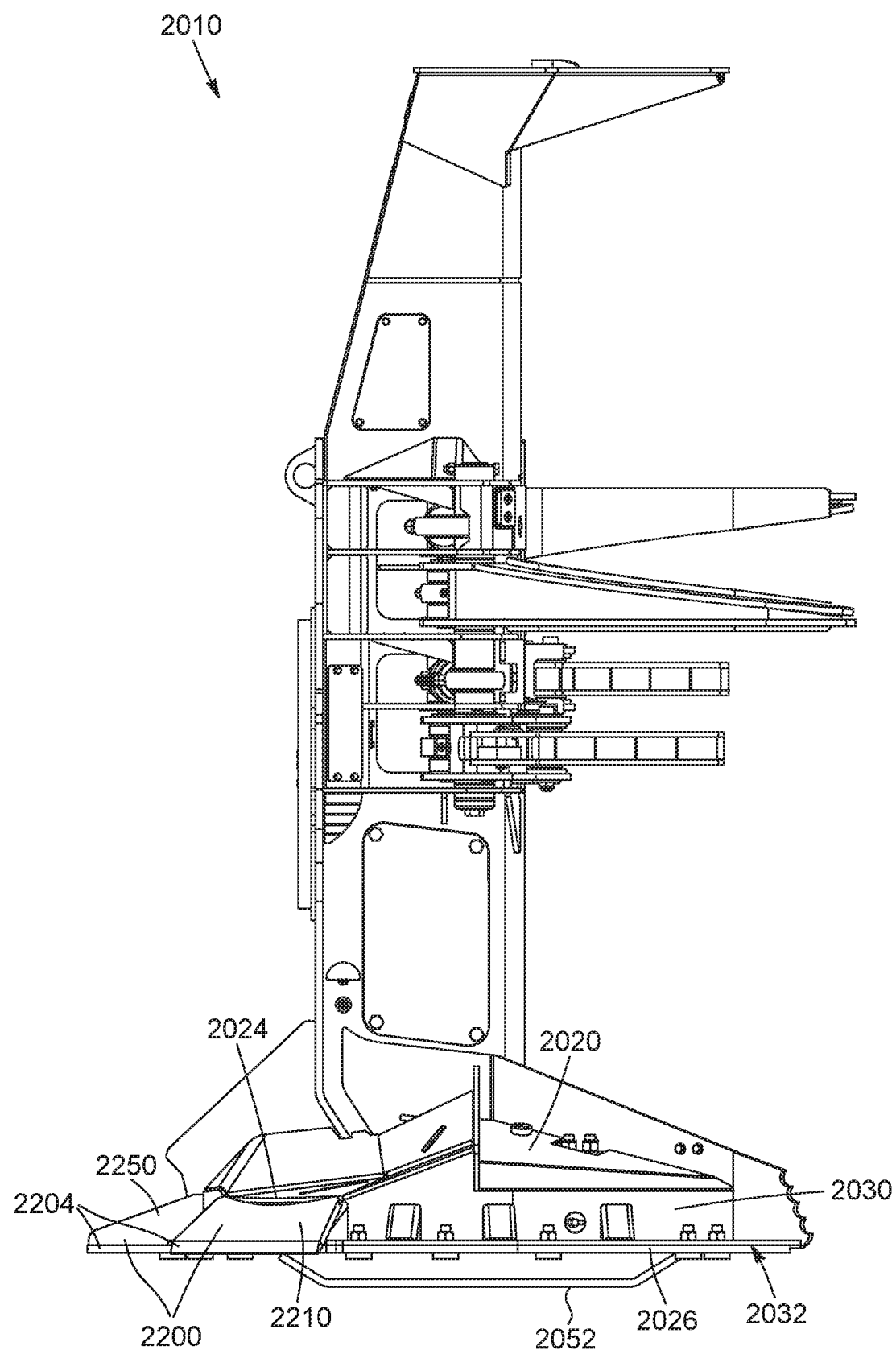
FIG. 9 is a side elevational view of a tree felling head in accordance with a third embodiment.

Referring now to FIGS. 6 to 8, there is shown a tree felling head 1010 comprising an excavating assembly 1200 in accordance with a second embodiment. The tree felling head 1010 comprises ground-contacting skis 1050, 1052 with ground-contacting surfaces 1051, 1053.

In the embodiment shown, the excavating assembly 1200 comprises a plurality of excavating blades 1210 and a plurality of excavating teeth 1250. The excavating assembly 1200 comprises scraping portions 1204 comprising scraping portions 1214, 1254 of the excavating blades 1210 and the excavating teeth 1250 respectively. The scraping portions 1204 of the excavating assembly 1200 extend outwardly past the ground adjacent edge 1026 (or peripheral border 1026) of the bottom saw housing 1020 at least partially bordering the saw-receiving cavity 1022, along at least a section of the peripheral border 1026 (i.e. protrude at least one of outwardly—i.e. towards the tree-cutting carrier when the equipped tree felling head 1010 is mounted thereto—and downwardly from the peripheral border 1026 the bottom saw housing 1020).

In the embodiment shown, the excavating assembly 1200 further comprises housing-mounting portions 1202 comprising housing-mounting portions 1212, 1252 of the excavating blades 1210 and the excavating teeth 1250 respectively at least partially superposed to the outer surface 1024 of the bottom saw housing 1020.

In the embodiment shown, the excavating assembly 1200 comprises free ends comprising free ends 1215, 1263 of the excavating blades 1210 and the excavating teeth 1250. As best shown in FIGS. 6 and 8, the free ends 1215, 1263 of the excavating blades 1210 and the excavating teeth 1250 extend above the ground-contacting surfaces 1051, 1053 of the ground-contacting skis 1050, 1052. Contrary to the first embodiment of the tree felling head 10 wherein the excavating blades 210 and the excavating teeth 250 are detachably mountable (i.e. securable) to the bottom saw housing 20 (to the outer surface 24 thereof), in the second embodiment shown, the housing-mounting portions 1212, 1252 of the excavating blades 1210 and the excavating teeth 1250 are permanently (or irremovably) mounted to the bottom saw housing 1020, for instance to the outer surface 1024 of the bottom saw housing 1020. In other words, the excavating blades 1210 and the excavating teeth 1250 cannot be removed (or separated) from the bottom saw housing 1020 (from the outer surface 1024 thereof in the embodiment shown) without at least partially damaging at least one of the excavating blades 1210, the excavating teeth 1250 and/or the bottom saw housing 1020.

For instance, the housing-mounting portions 1212 of the excavating blades 1210 are welded to the outer surface 1024 of the bottom saw housing 1020, at the rear left and right corners 1021, 1023 thereof, for instance in the vicinity of a junction of the peripheral side wall 1030 and the top wall 1028.

In the second embodiment shown, the housing-mounting portions 1252 of the excavating teeth 1250 are welded to the outer surface 1024 of the bottom saw housing 1020. In the embodiment shown, the housing-mounting portions 1252 are engaged into tooth-receiving slots 1035 formed in tooth-mounting flanges 1034 protruding outwardly from the outer surface 1024 of the bottom saw housing 1020. For instance, the tooth-receiving slots 1035 open at the free lower end of the tooth-mounting flanges 1034. In the embodiment shown, the excavating teeth 1250 (in particular the housing-mounting portions 1252 thereof) are substantially plate-shaped (i.e. substantially flat) so that at least a section of the housing-mounting portions 1252 is engaged and welded into the corresponding tooth-receiving slot 1035. In the embodiment shown, the junction of the housing-mounting portions 1252 and the corresponding free end of the tooth-mounting flange 1034 has a substantially cruciform cross-section. The excavating assembly 1200 in accordance with the second embodiment could still be used to be arranged on an existing tree felling head, by securing (for instance welding) the housing-mounting portions 1202 thereof to the bottom saw housing of the tree felling head.

It could also be conceived a tree felling head wherein some of the excavating teeth and/or excavating blades would be detachably mountable (i.e. securable) to the bottom saw housing, whereas some other of the excavating teeth and/or excavating blades would be irremovably mounted (for instance welded or by any other adapted irremovable fasteners) to the bottom saw housing.

Third and Fourth Embodiments

The present disclosure is not limited to a tree felling head wherein the excavating assembly comprises elements mounted (either detachably or permanently) to the bottom saw housing (for instance to the outer surface thereof) and having a housing-mounting portion that would be at least partially superposed to the outer surface of the bottom saw housing. It could also be conceived an excavating assembly that would be at least partially formed integral with at least a portion of the bottom saw housing.

Referring now to FIGS. 9 to 14, there is shown a tree felling head 2010 comprising an excavating assembly 2200 in accordance with a third embodiment.

In the embodiment shown, the excavating assembly 2200 comprises a plurality of excavating blades 2210 and a plurality of excavating teeth 2250. The excavating assembly 2200 comprises scraping portions 2204 comprising scraping portions 2214, 2254 of the excavating blades 2210 and the excavating teeth 2250 respectively. The scraping portions 2204 of the excavating assembly 2200 extend outwardly past the ground adjacent edge 2026 of the bottom saw housing 2020 along at least a section thereof (i.e. protrude at least one of outwardly and downwardly from the section of the peripheral border 2026 of the bottom saw housing 2020).

In the embodiment shown, similarly to the second embodiment, the excavating blades 2210 are irremovably mounted (for instance welded) to the outer surface 2024 of the bottom saw housing 2020.

Figure 13:
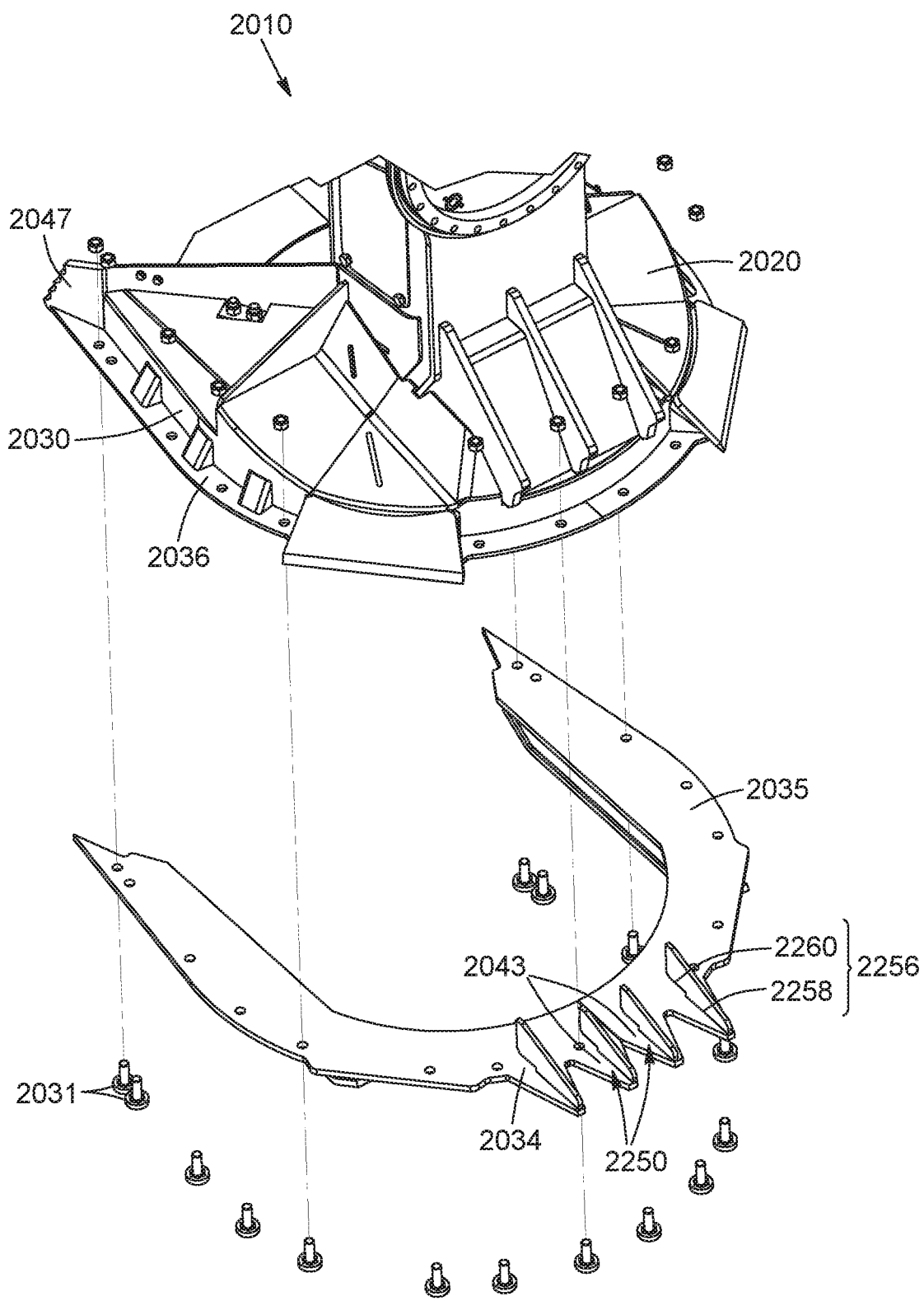
FIG. 13 is top perspective view, partially exploded, of the tree felling head of FIG. 9.
Figure 14:
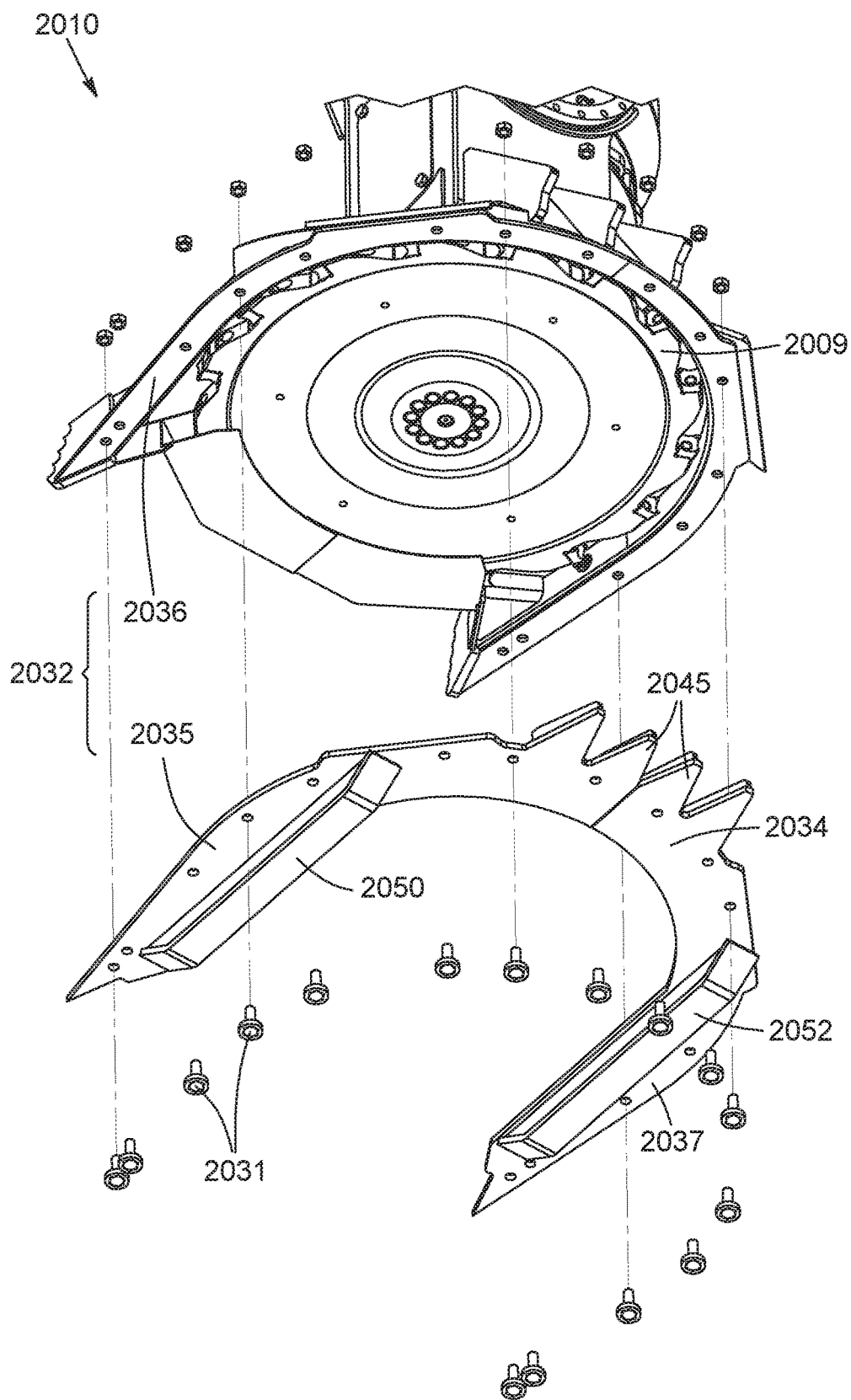
FIG. 14 is a bottom perspective view, partially exploded, of the tree felling head of FIG. 9.
Figure 15:
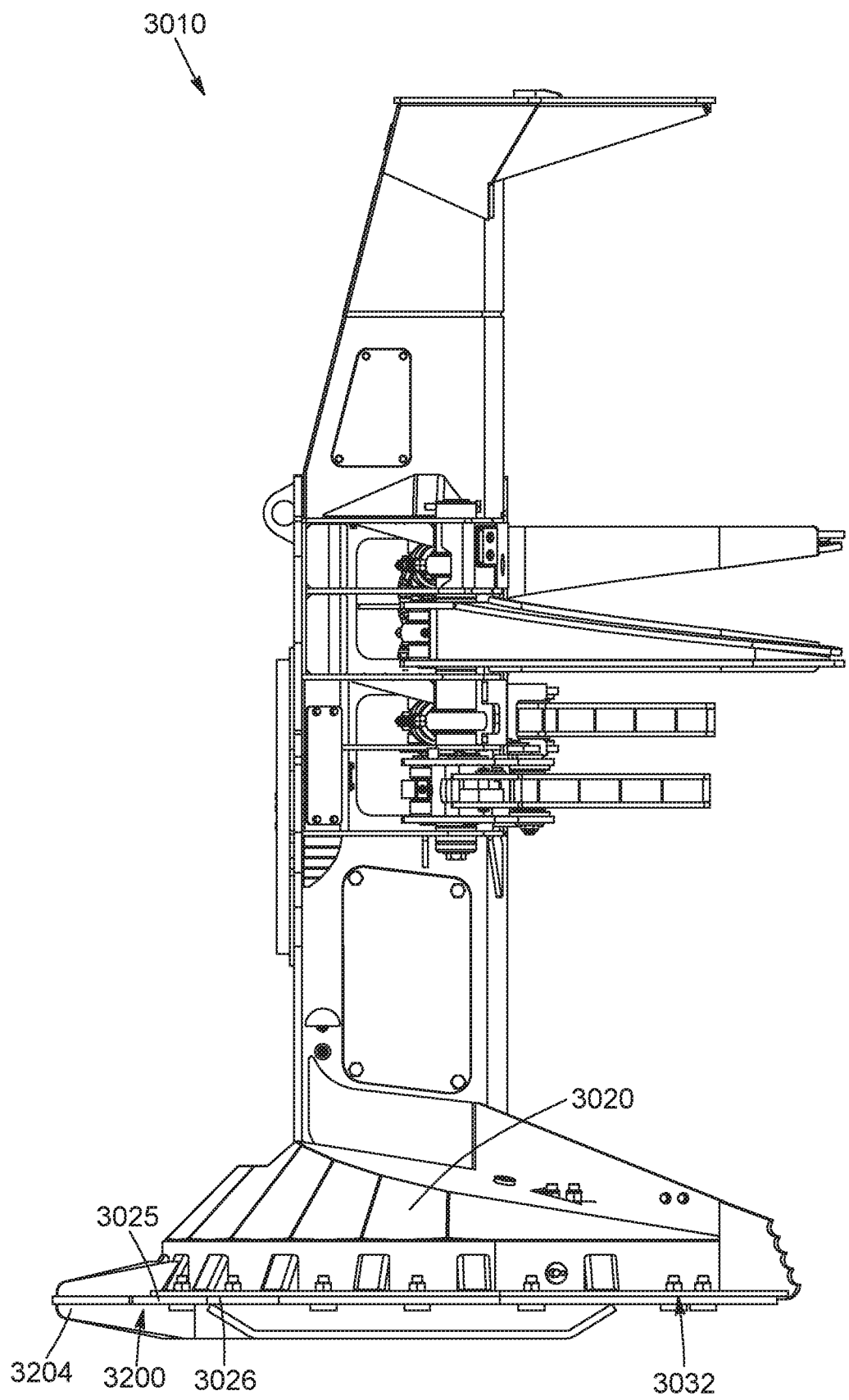
FIG. 15 is a side elevational view of a tree felling head in accordance with a fourth embodiment.
Figure 16:
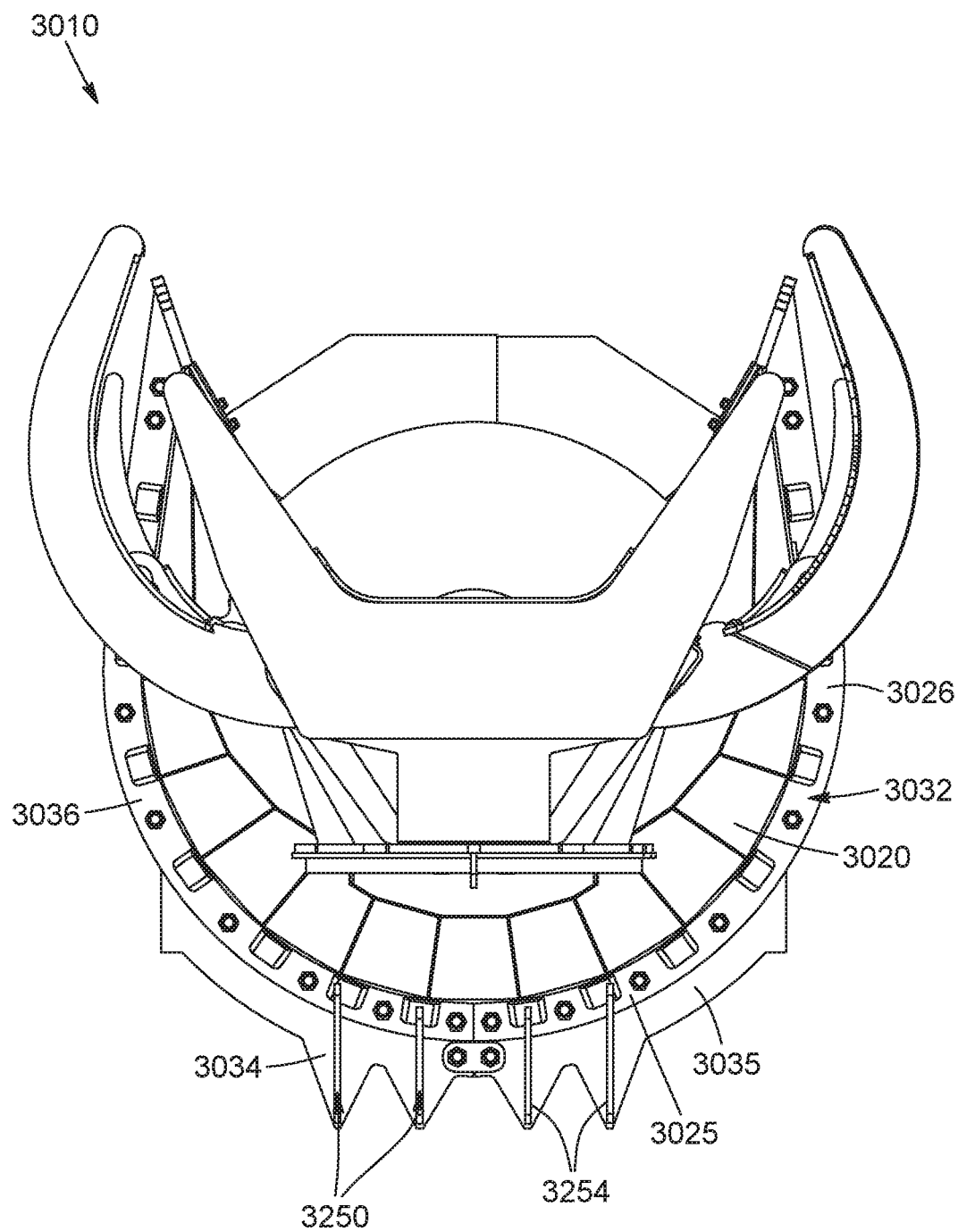
FIG. 16 is a top elevational view of the tree felling head of FIG. 15.
Figure 17:
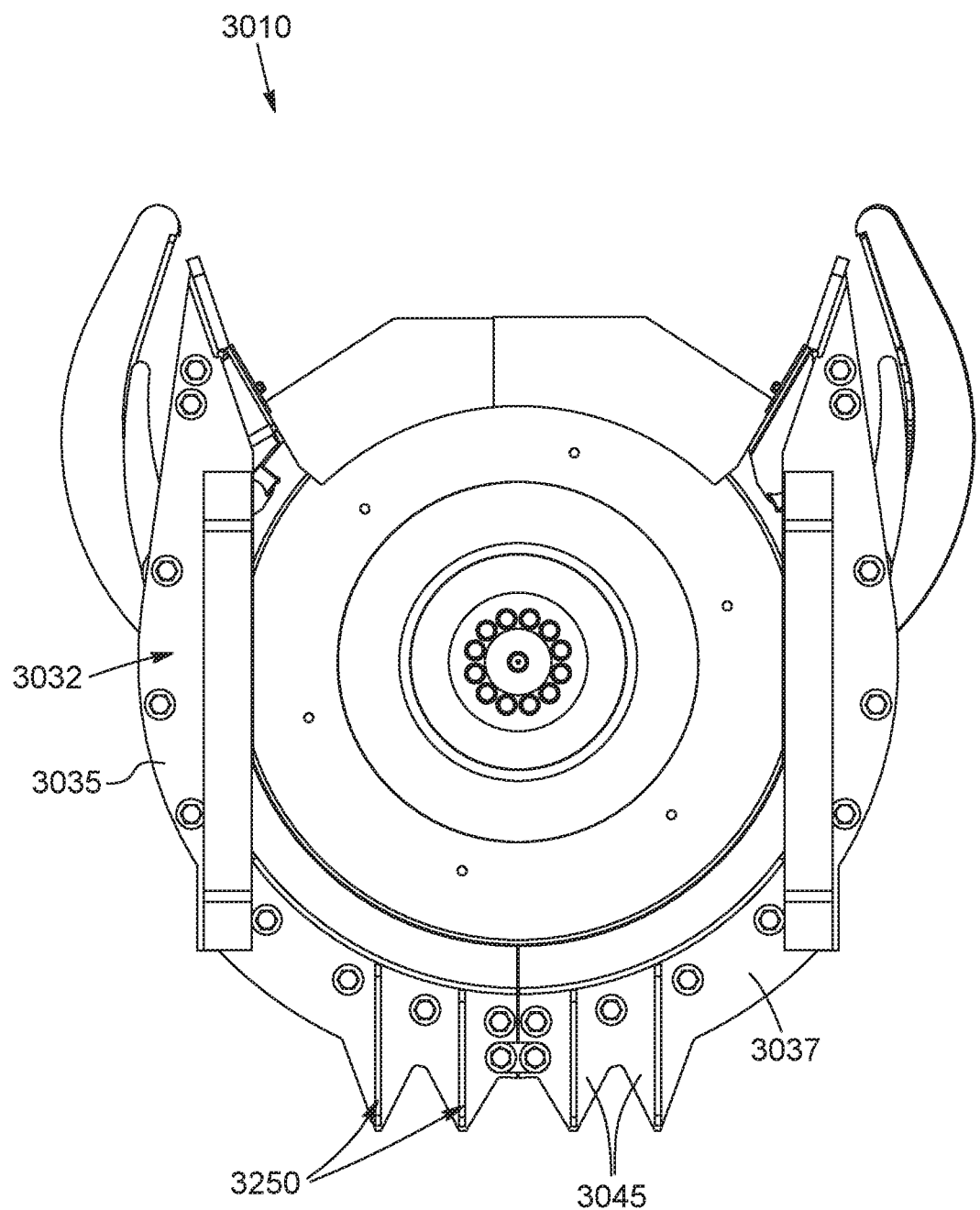
FIG. 17 is a bottom elevational view of the tree felling head of FIG. 15.
Figure 18:
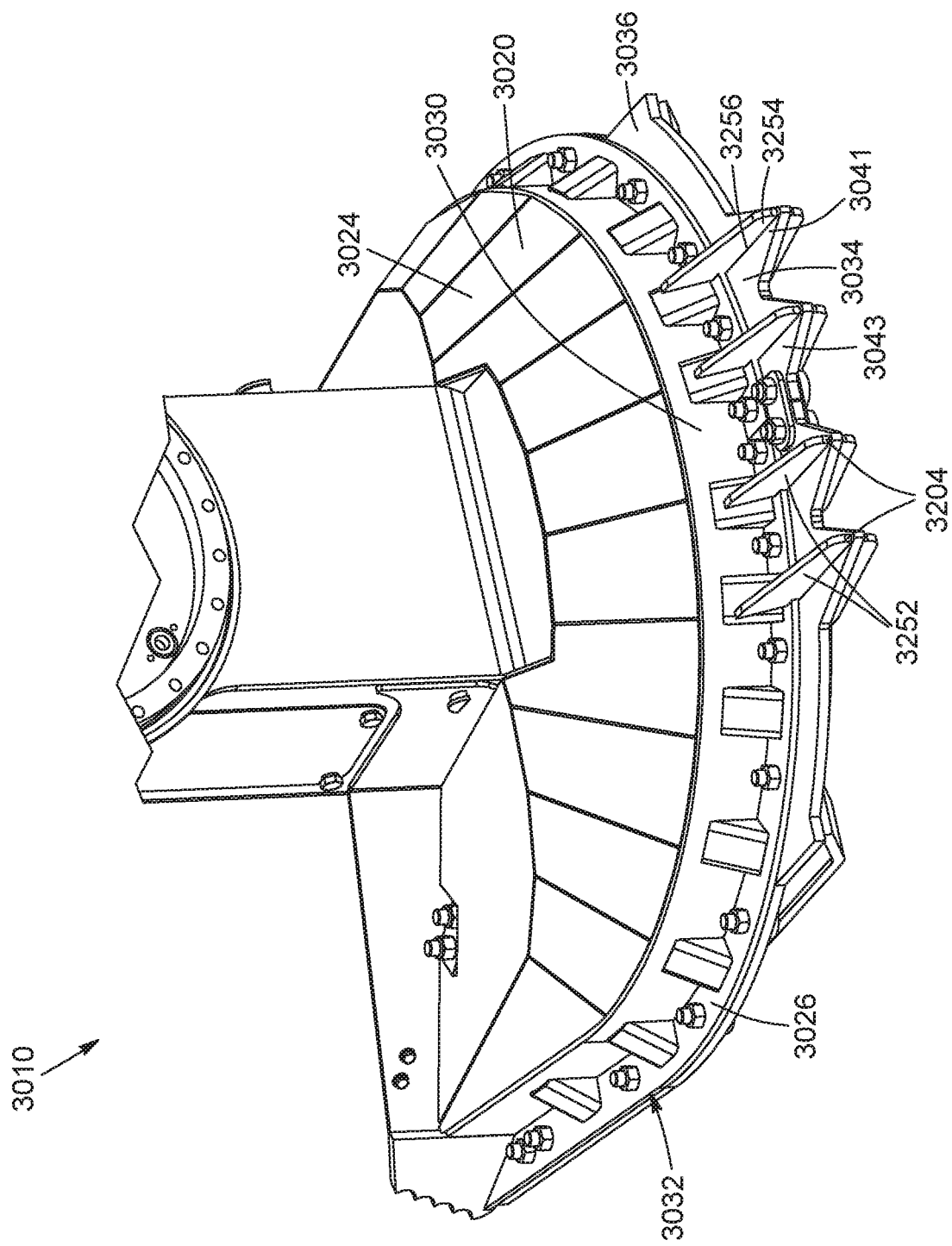
FIG. 18 is a rear perspective view of the tree felling head of FIG. 15.

The bottom saw housing 2020 further comprises a lower blade guard 2032 at a lower end of the side peripheral wall 2030 with ground-contacting skis 2050, 2052 extending downwardly from a lower surface 2037 thereof. In the embodiment shown, the lower blade guard 2032 comprises a lower peripheral member 2035 and an upper peripheral member 2036. As best shown in FIGS. 13 and 14, the lower and upper blade guard peripheral members 2035, 2036 of the lower blade guard 2032 are substantially U-shaped and are removably secured to each other, via mechanical fasteners 2031 engaged in corresponding fastener-receiving openings formed in the upper and lower blade guard peripheral members 2036, 2035. In the embodiment shown, the upper peripheral member 2036 of the lower blade guard 2032 is secured, for instance welded, to the peripheral side wall 2030. As best shown in FIGS. 13 and 14, a portion of an outer edge of the lower blade guard peripheral member 2035 is substantially in register with an outer edge of the upper blade guard peripheral member 2036 (i.e. does not extend outwardly therefrom), so that said portion of the outer edge of the lower glade guard peripheral member 2035 and the upper blade guard peripheral member 2036 form together at least partially the peripheral border 2026 of the bottom saw housing 2020.

The lower blade guard 2032 further comprises front portions 2047 (i.e. left and right front portions 2047) extending outwardly (i.e. away from the tree-cutting carrier when the equipped tree felling head 2010 is mounted thereto) past a front-end portion of the saw blade disk 2009.

Figure 10:
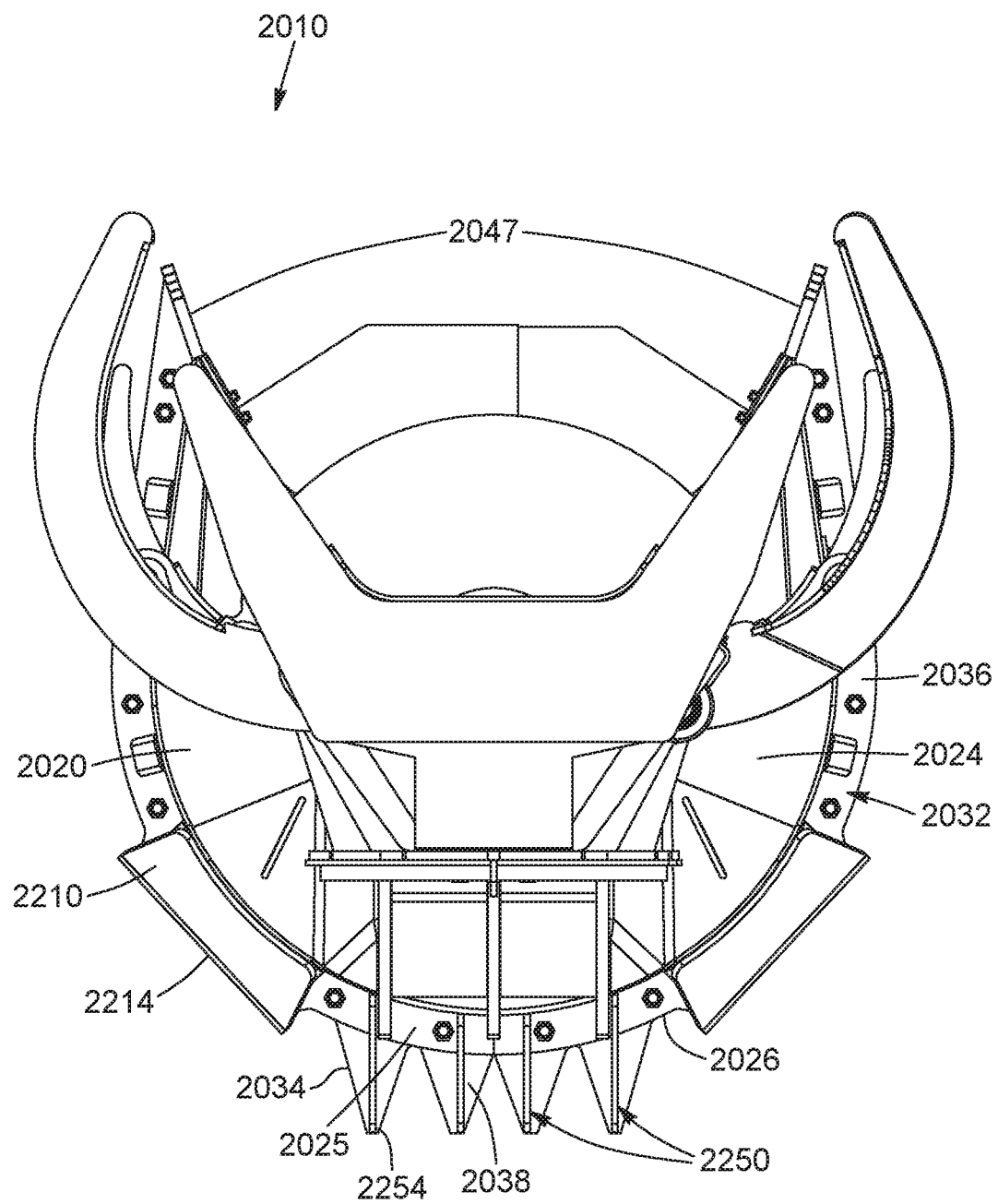
FIG. 10 is a top elevational view of the tree felling head of FIG. 9.
Figure 11:
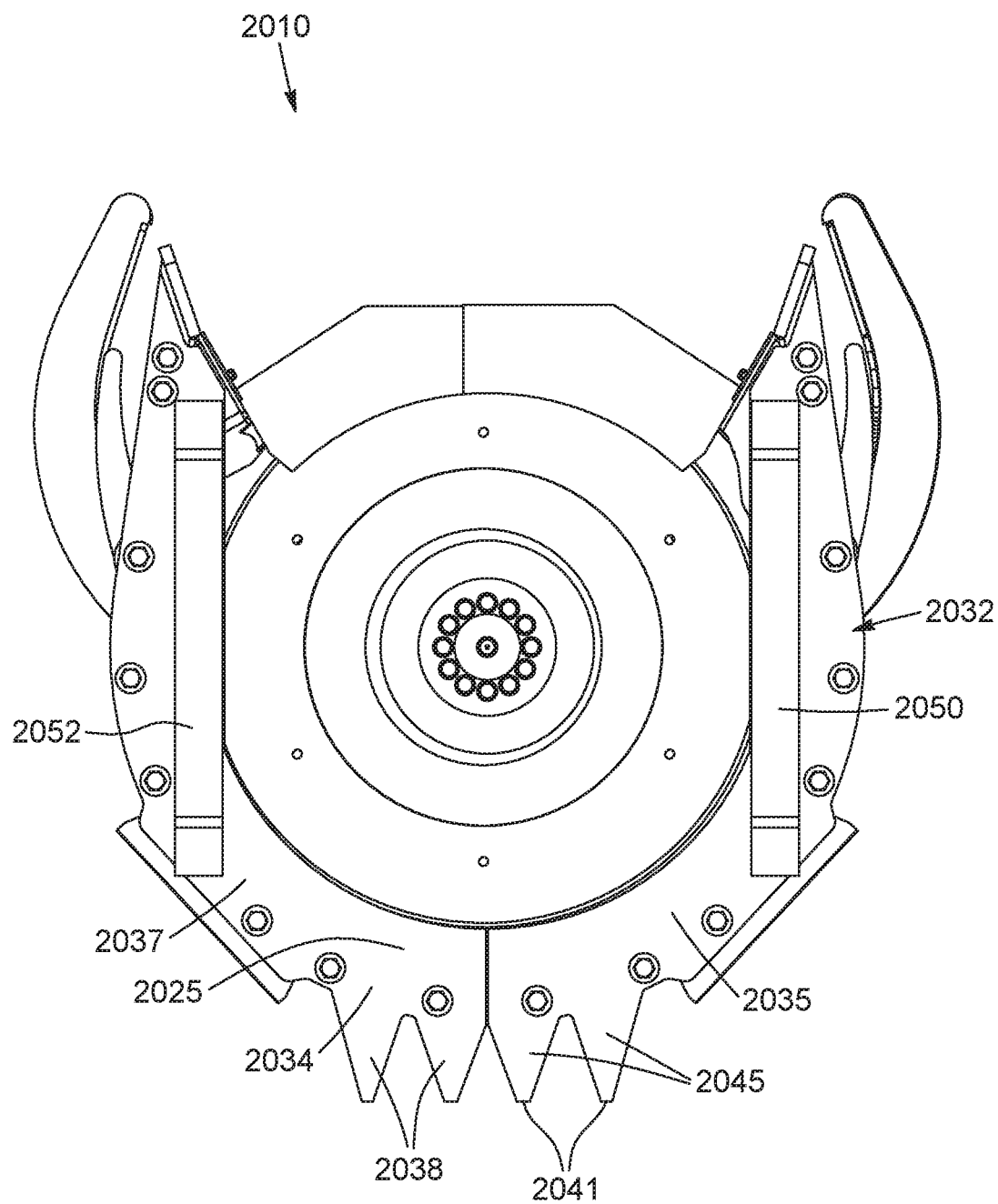
FIG. 11 is a bottom elevational view of the tree felling head of FIG. 9.

The lower blade guard 2032 (the lower peripheral member 2035 thereof, in the embodiment shown) has a rear portion 2034 extending at least partially outwardly past the peripheral border 2026 at least along a section thereof. The excavating teeth 2250 are at least partially formed by the rear portion 2034 of the lower blade guard 2032. As best shown in FIGS. 10 and 11, the rear portion 2034 has a tooth profile (or saw-like profile) with a plurality (four, in the embodiment shown) of substantially planar and triangular tooth members 2038 extending outwardly (i.e. towards the tree-cutting carrier when the equipped tree felling head 2010 is mounted thereto) and substantially horizontally and having a substantially sharp-shaped free end 2041. The tooth members 2038 form at least partially the excavating teeth 2250. The tooth members 2038 have an upper surface 2043 (forming at least partially an upper surface of the lower peripheral member 2035 of the lower blade guard 2032) and a lower surface 2045 (forming at least partially the lower surface 2037 of the lower blade guard 2032).

It is thus understood the excavating teeth 2250 extend outwardly along at least a portion of the peripheral border 2026. In the embodiment shown, the excavating teeth 2250 define a disk sector comprised between about 10 degrees and about 150 degrees. In some other embodiments, the excavating teeth 2250 define a disk sector comprised between about 30 degrees and about 120 degrees. In yet some other embodiments, the excavating teeth 2250 define a disk sector comprised between about 50 degrees and about 100 degrees.

In the embodiment shown, each of the excavating teeth 2250 further comprises an upper scraping fin 2252 protruding substantially vertically from the upper surface 2043 of the corresponding tooth member 2038 (i.e. protruding from the upper surface of the rear portion of the lower blade guard peripheral member 2035). In other words, the upper scraping fin and the tooth member are substantially perpendicular to each other, in the embodiment shown. The upper scraping fin 2252 has a substantially triangular shape with a substantially sharp-shaped free end 2254. The upper scraping fin 2252 has a lower edge 2256 having a distal portion 2258 superposed onto the upper surface 2043 of the corresponding tooth member 2039 and a proximal portion 2260 superposed onto an upper surface of the portion of the upper blade guard peripheral member 2036 at least partially bordering a rear portion of the peripheral side wall 2030 (i.e. the proximal portion 2260 is at least partially superposed onto the rear section 2025 of the peripheral border 2026). In other words, in the embodiment shown, the portion of the upper peripheral member 2036 at least partially bordering the rear portion of the peripheral side wall 2030 is sandwiched between the upper scraping fin 2252 and the rear portion 2034 of the lower blade guard peripheral member 2035.

It is thus understood that in the embodiment shown, each of the excavating teeth 2250 has a substantially T-shaped cross-section formed by the junction of the upper scraping fin and the tooth member.

In otherwords, in the embodiment shown, the excavating assembly 2200 comprises a lower blade guard peripheral member 2035 superposable onto the lower surface of the bottom housing 2020, the lower blade guard peripheral member 2035 having a rear portion forming at least partially the excavating teeth 2250.

It is appreciated that the shape, the configuration, and the location of the lower blade guard, the upper and lower peripheral members thereof, the rear portion of the lower blade guard and the shape, the configuration, the location and the number of the excavating teeth at least partially formed by the lower blade guard and scraping fins can vary from the embodiment shown.

Referring now to FIGS. 15 to 20, there is shown a tree felling head 3010 comprising an excavating assembly 3200 in accordance with a fourth embodiment.

In the embodiment shown, the excavating assembly 3200 comprises a plurality of excavating teeth 3250 and does not comprise excavating blades. The excavating assembly 3200 comprises scraping portions 3204 comprising scraping portions 3254 of the excavating teeth 3250. The scraping portions 3204 of the excavating assembly 3200 extend outwardly past the ground adjacent edge 3026 of the bottom saw housing 3020 along at least a section thereof (i.e. protrude at least one of outwardly and downwardly from the peripheral border 3026 of the bottom saw housing 3020).

In the embodiment shown, similarly to the third embodiment, the lower blade guard 3032 comprises a lower peripheral member 3035 (or lower blade guard peripheral member 3035) and an upper peripheral member 3036 (or upper blade guard peripheral member 3036).

Figure 19:
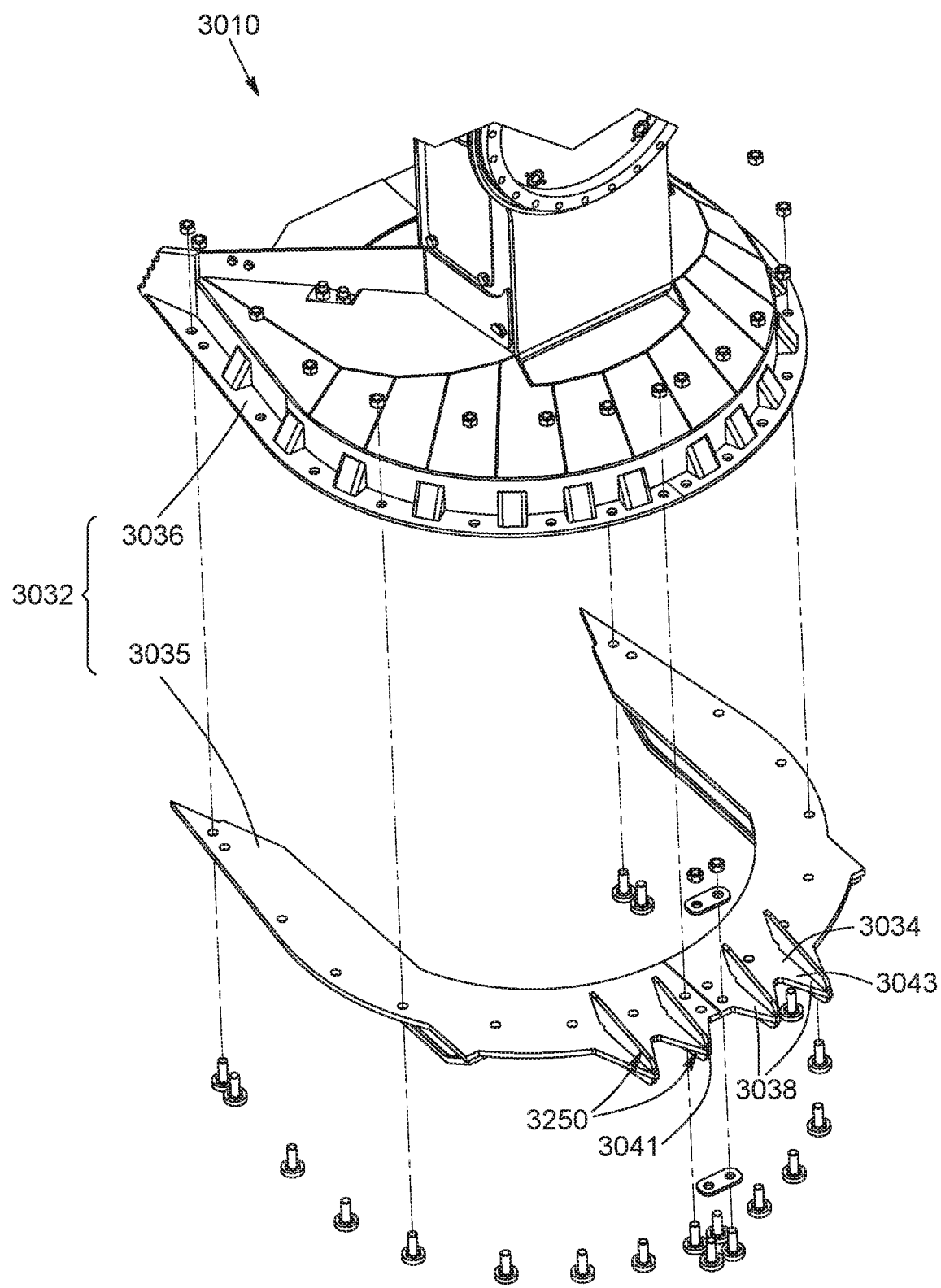
FIG. 19 is top perspective view, partially exploded, of the tree felling head of FIG. 15.
Figure 20:
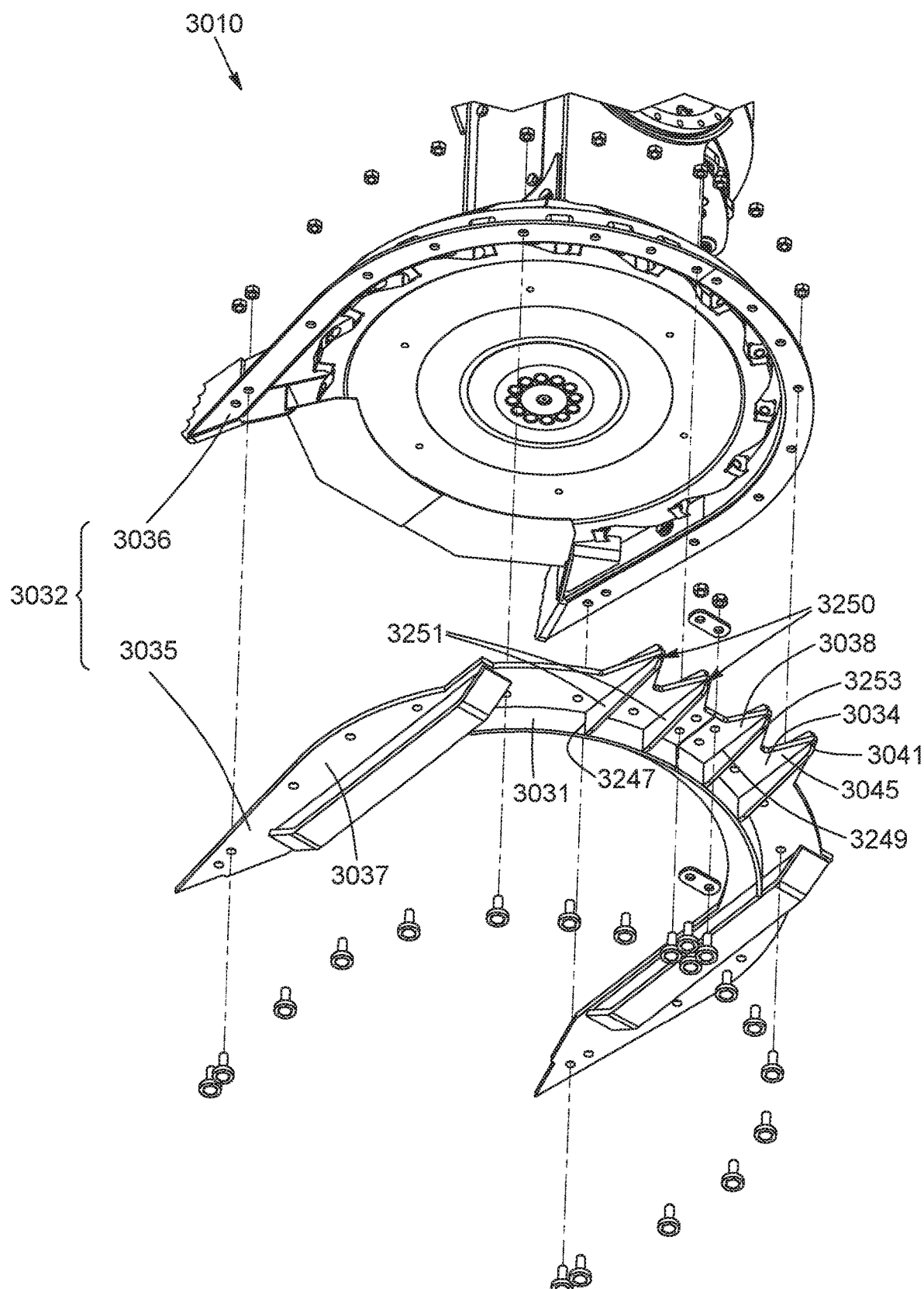
FIG. 20 is a bottom perspective view, partially exploded, of the tree felling head of FIG. 15.

The lower blade guard 3032 (the lower peripheral member 3035 thereof, in the embodiment shown) has a rear portion 3034, the excavating teeth 3250 being at least partially formed by the rear portion 3034 of the lower blade guard 3032. As best shown in FIGS. 19 and 20, the rear portion 3034 has a tooth profile (or saw-like profile) with a plurality (four, in the embodiment shown) of substantially planar and triangular tooth members 3038 extending outwardly (i.e. towards the tree-cutting carrier when the equipped tree felling head 3010 is mounted thereto) and substantially horizontally and having a substantially sharp-shaped free end 3041. The tooth members 3038 form at least partially the excavating teeth 3250. The tooth members 3038 have an upper surface 3043 (forming at least partially an upper surface of the lower blade guard peripheral member 3035) and a lower surface 3045 (forming at least partially the lower surface 3037 of the lower blade guard 3032).

In the embodiment shown, each of the excavating teeth 3250 further comprises an upper scraping fin 3252 and a lower scraping fin 3251 protruding substantially vertically respectively from the upper surface 3043 and the lower surface 3045 of the corresponding tooth member 3038 (i.e. protruding respectively from the upper surface and the lower surface of the lower blade guard peripheral member 3035). In other words, each of the upper and lower scraping fins are substantially perpendicular to the tooth member, in the embodiment shown. The upper and lower scraping fins 3252, 3251 have a substantially triangular shape with a substantially sharp-shaped free end 3254, 3253. The upper scraping fin 3252 has a lower edge 3256 substantially similar to the third embodiment of the excavating assembly 2200 and shaped and dimensioned so that a portion of the upper blade guard peripheral member 3036 at least partially bordering the rear portion of the peripheral side wall 3030 is sandwiched between the upper scraping fin 3252 and the rear portion 3034 of the lower blade guard peripheral member 3035 (i.e. so that the rear section 3025 of the peripheral border 3026 at least partially formed by the rear section of the upper blade guard peripheral member 3036 is sandwiched between the upper scraping fin 3252 and the rear portion 3034 of the lower blade guard peripheral member 3035).

In the embodiment shown, the lower blade guard 3032 further comprises a lower peripheral bordering member 3031 extending downwardly from the lower surface of the lower blade guard peripheral member 3035. The lower scraping fin 3251 has an upper edge 3249 secured to the lower surface of the lower blade guard peripheral member 3035 and a proximal edge 3247 secured to an outer surface of the lower peripheral bordering member 3031.

It is thus understood that in the fourth embodiment shown, each of the excavating teeth 3250 has a substantially cruciform cross-section formed by the junction of the upper scraping fin, the lower scraping fin and the tooth member.

Other Possible Embodiments

It is appreciated that the shape, the configuration, the number and the location of the different components of the excavating assemblies can vary from the embodiments shown.

Figure 21:
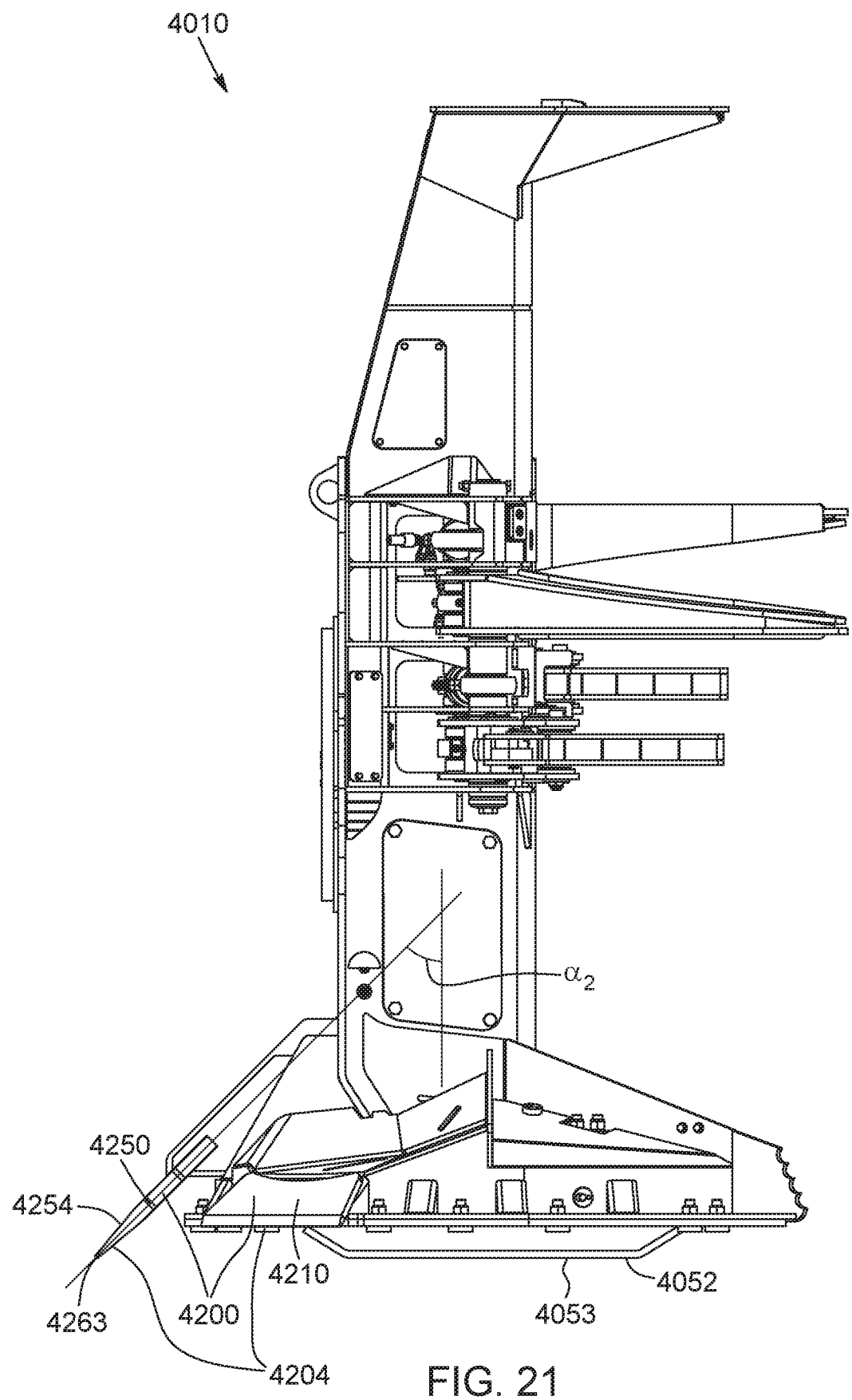
FIG. 21 is a side elevational view of a tree felling head in accordance with a fifth embodiment.
Figure 22:
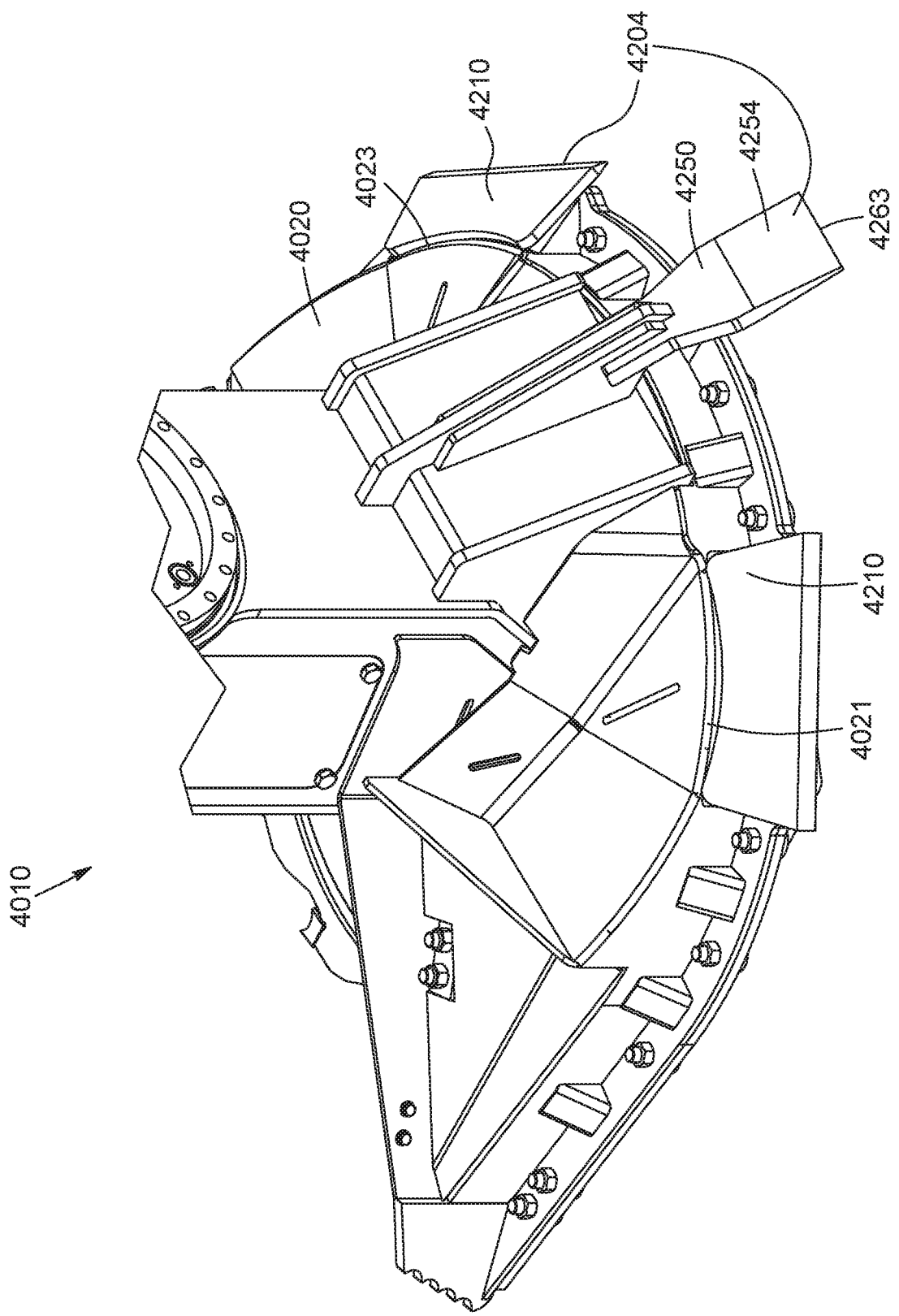
FIG. 22 is a rear perspective view of the tree felling head of FIG. 21.

For instance, as represented in FIGS. 21 and 22, it could be conceived a tree felling head 4010 comprising an excavating assembly 4200 comprising two excavating blades 4210 arranged at left and right rear corners 4021, 4023 of the bottom saw housing 4020, and a single excavating tooth 4250 arranged between the left and right excavating blades 4210.

Moreover, in the embodiment shown, the excavating tooth 4250 comprises a scraping portion 4254 forming at least partially a scraping portion 4204 of the excavating assembly 4200. The scraping portion 4254 comprises a free end 4263 (or lower edge 4263 or scraping edge 4263) extending below ground-contacting surfaces 4053 of ground-contacting skis 4052 extending downwardly from a lower surface of the bottom saw housing 4020.

Similarly to the above-described first embodiment, the scraper tooth 4250 (or excavating tooth) defines an inclination angle with respect to vertical. In other words, the scraping portion 4254 of the excavating tooth 4250 has an inner surface (considered with respect to the saw-receiving cavity defined by the bottom saw housing) defining a tooth inclination angle $\alpha 2$.

Figure 23:
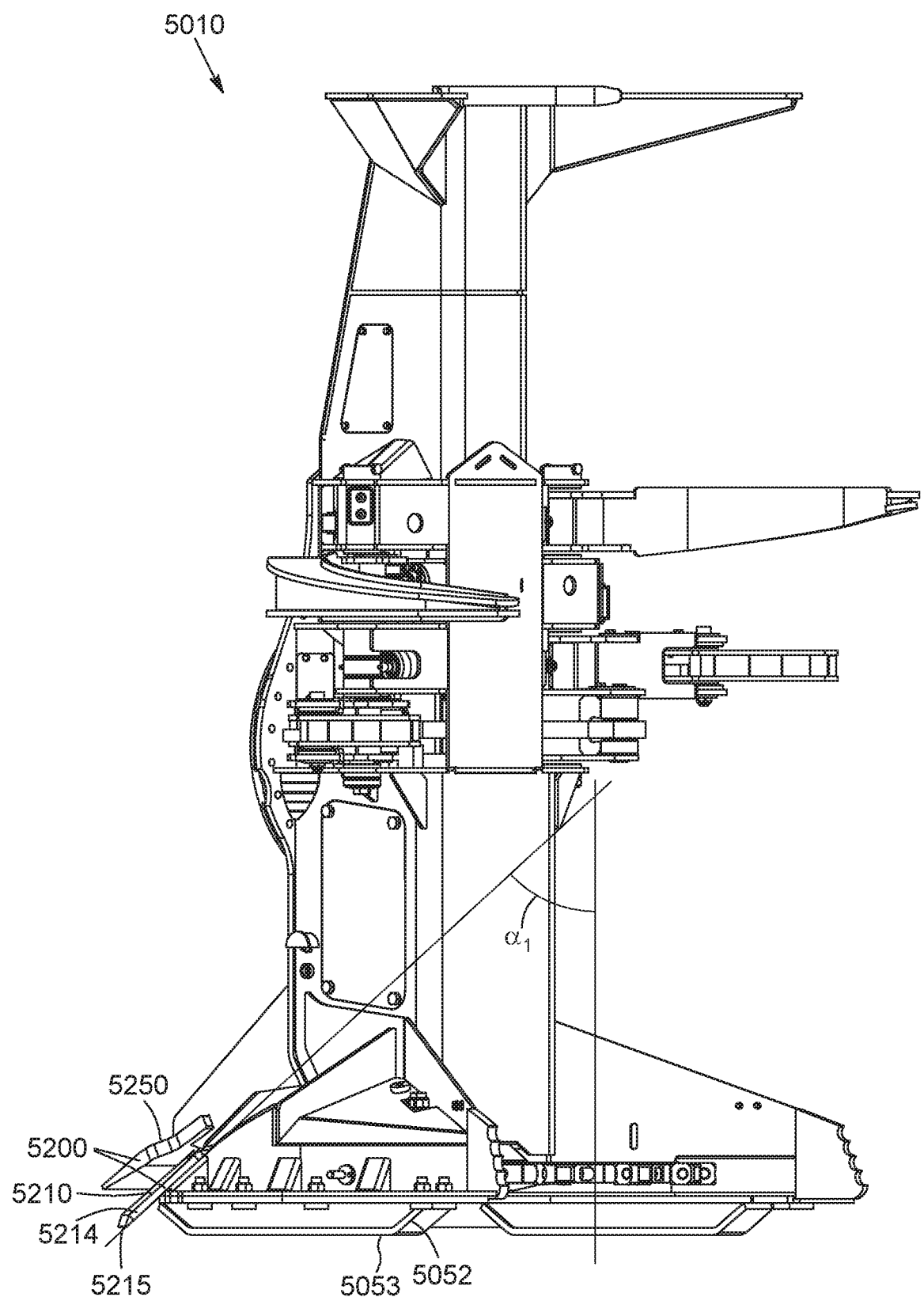
FIG. 23 is a front side view of a tree felling head in accordance with a sixth embodiment.
Figure 24:
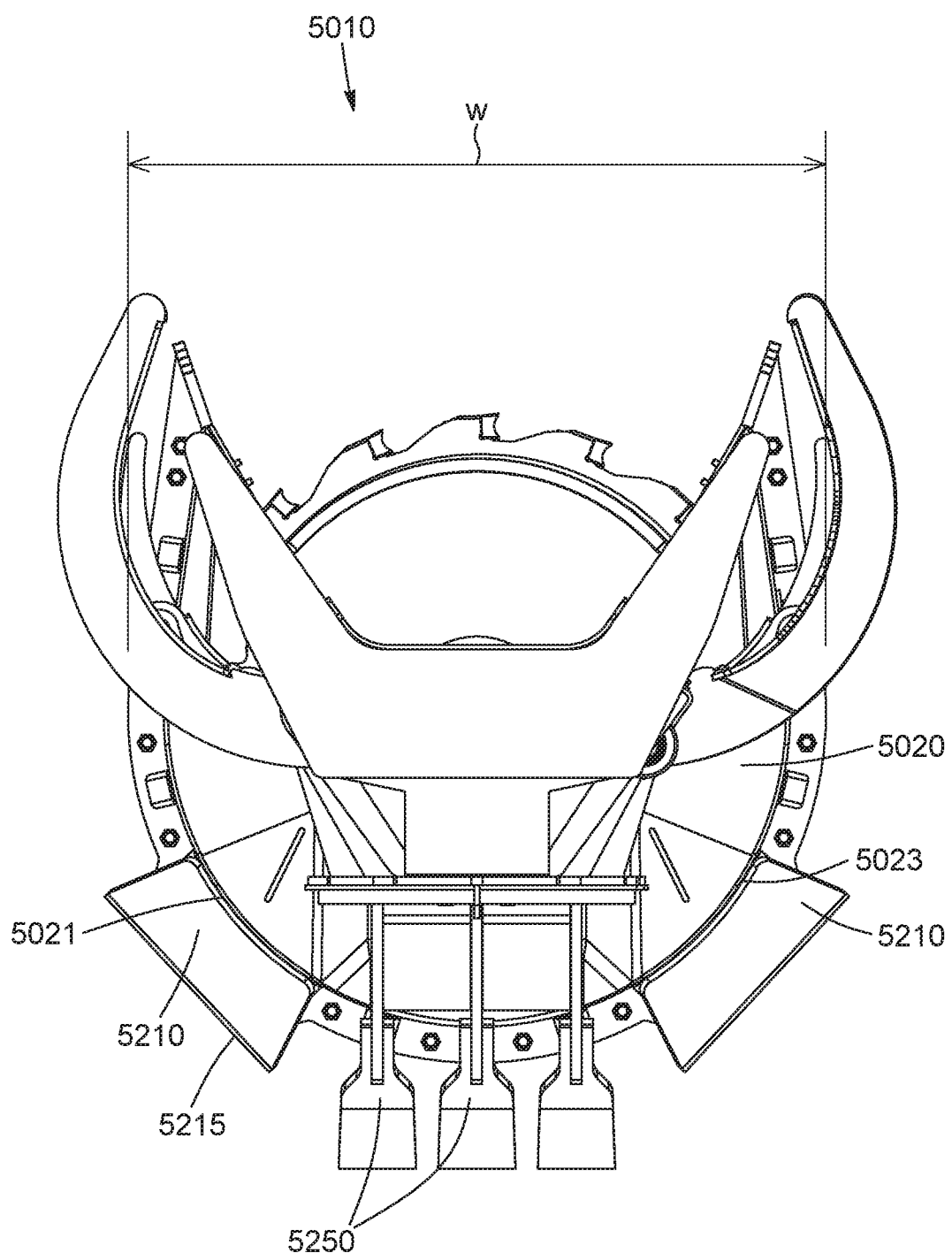
FIG. 24 is a top elevational view of the tree felling head of FIG. 23.

As represented in FIGS. 23 and 24, it could be conceived a tree felling head 5010 according to another possible embodiment comprising an excavating assembly 5200 comprising two excavating blades 5210 arranged at left and right rear corners 5021, 5023 of the bottom saw housing 5020, and excavating teeth 5250 arranged between the left and right excavating blades 5210.

In the embodiment shown, the excavating blades 5210 are shaped and dimensioned so that at least a section of a free end 5215 of scraping portions 5214 thereof extend beyond the width W of the bottom saw housing 5020. The excavating blades 5210 are also shaped and dimensioned so that the free ends 5215 are substantially aligned, considered in a substantially horizontal orientation with ground-contacting surfaces 5053 of ground-contacting skis 5052 extending downwardly from a lower surface of the bottom saw housing 5020.

Similarly to the above-described first embodiment, the excavating blades 5210 defines an inclination angle with respect to vertical. In other words, the scraping portion 5214 of the excavating blade 5210 has an inner surface (considered with respect to the saw-receiving cavity defined by the bottom saw housing) defining a blade inclination angle $\alpha 1$.

It is further appreciated that the shape, the configuration and the structure of the bottom saw housing can vary from the embodiments shown.

Figure 12:
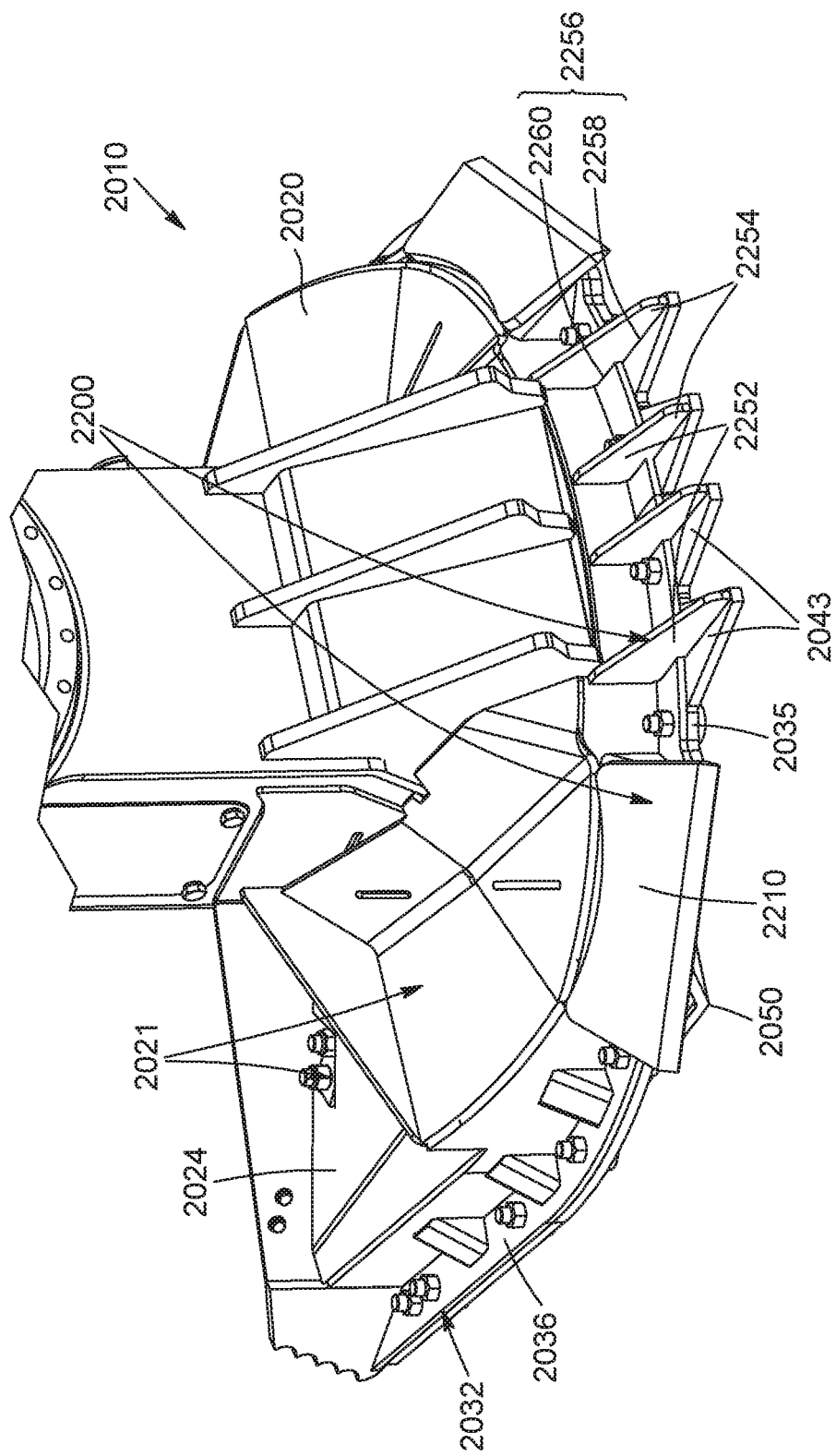
FIG. 12 is a rear perspective view of the tree felling head of FIG. 9.

For instance, as best shown in FIG. 12, a plurality of material-receiving cavities 2021 can be formed in the outer surface 2024 of the bottom saw housing 2020 that are shaped and dimensioned to receive material upon excavation and/or climbing operations by the excavating assembly 2200, so as to limit the risk that the removed material falls back in the formed excavations. In other words, the bottom saw housing 2020 has substantially bucket-shaped cavities. In another embodiment, as represented for instance in FIG. 18, the outer surface 3024 of the bottom saw housing 3020 has a substantially convex shape, at least along a rear portion thereof.

Method for at Least One of Excavating a Ground and Escalading a Slope with a Tree Felling Head The disclosure also concerns a method for at least one of excavating a ground and escalading on a slope with a tree felling head 10. Even though the method is described with the embodiment shown in FIGS. 1 to 5, it can also be carried out with the embodiments described in reference to FIGS. 6 to 24.

The method comprises mounting the tree felling head 10 to a tree-cutting carrier 100, the tree felling head 10 comprising a bottom saw housing 20 defining a saw-receiving cavity 22 and comprising a ground adjacent edge 26 (or peripheral border 26) at least partially delimiting (or bordering) the saw-receiving cavity 22). The method further comprises providing an excavating assembly 200 having a scraping portion 204 extending outwardly past the peripheral border 26 at least along a section thereof. The method further comprises arranging the excavating assembly 200 on the bottom saw housing 20 for the scraping portion 204 to extend outwardly past the peripheral border 26 at least along a section thereof. The method further comprises swinging the felling head 10 for the excavating assembly 200 to scrap the ground or to form a step into the slope.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind.

The invention claimed is:

1. A tree felling head for mounting to a tree-cutting carrier, the tree felling head comprising:
   A bottom saw housing defining a saw-receiving cavity and comprising a peripheral border at least partially bordering the saw-receiving cavity; and An excavating assembly comprising a housing-mounting portion fixedly secured to a rear portion of the bottom saw housing and a ground-digging portion extending outwardly past the peripheral border at least along a section thereof.

2. The tree felling head according to claim 1, further comprising a substantially vertically extending frame having a longitudinal axis with the bottom saw housing being mounted to a lower end of the vertically-extending frame and wherein the ground-digging portion has an inner surface defining an acute inclination angle with the longitudinal axis of the vertically-extending frame.

3. The tree felling head according to claim 1, wherein the ground-digging portion comprises a free end extending at least one of outwardly and downwardly with respect to the section of the peripheral border and wherein the ground-digging portion is tapered with a thickness decreasing towards the free end.

4. The tree felling head according to claim 1, wherein the excavating assembly comprises at least one excavating tooth comprising a tooth ground-digging portion forming at least partially the ground-digging portion of the excavating assembly, wherein the tooth ground-digging portion has one of a substantially T-shaped cross-section and a substantially cruciform cross-section.

5. The tree felling head according to claim 4, wherein the bottom saw housing comprises a peripheral side wall at least partially delimiting the saw-receiving cavity, the tree felling head further comprising a lower blade guard mounted to or formed integral with a lower portion of the peripheral side wall and having a rear portion, the at least one excavating tooth being at least partially formed by the rear portion of the lower blade guard.

6. The tree felling head according to claim 5, wherein the rear portion of the lower blade guard comprises one or more substantially planar tooth members having an upper surface and a lower surface and forming at least partially the at least one excavating tooth, the at least one excavating tooth further comprising at least one of an upper ground-digging fin and a lower ground-digging fin protruding respectively from the upper surface and the lower surface of the corresponding tooth member.

7. The tree felling head according to claim 4, wherein the bottom saw housing has an outer surface and the tree felling head further comprises at least one tooth-mounting flange protruding outwardly from the outer surface of the bottom saw housing, wherein the at least one excavating tooth is removably mounted to the at least one tooth-mounting flange, and wherein the at least one tooth-mounting flange has a rear end, wherein the tree felling head comprises a tooth-mounting pad extending at least one of downwardly and outwardly from the rear end of the tooth-mounting flange, and wherein the excavating tooth comprises a housing-fastening sleeve removably engageable with the tooth-mounting pad.

8. The tree felling head according to claim 1, wherein the bottom saw housing comprises a peripheral side wall having an outer surface and wherein the excavating assembly comprises at least one excavating blade secured to a section of the outer surface of the peripheral side wall.

9. The tree felling head according to claim 8, wherein the excavating blade comprises a housing-mounting portion secured to the bottom saw housing.

10. A tree felling head for mounting to a tree-cutting carrier, the tree felling head comprising:
    A substantially vertically extending frame having a longitudinal axis;

A bottom saw housing fixedly mounted to a lower end of the frame, the bottom saw housing defining a saw-receiving cavity and comprising a peripheral border at least partially bordering the saw-receiving cavity; and An excavating assembly mounted to a rear portion of the bottom saw housing and comprising a ground-digging portion;

Wherein considered in a plane substantially perpendicular to the longitudinal axis of the frame, the ground-digging portion extends outwardly past the peripheral border of the bottom saw housing and the frame.

11. The tree felling head according to claim 10, wherein the excavating assembly comprises at least one excavating tooth comprising a tooth ground-digging portion and wherein the tooth ground-digging portion has one of a substantially T-shaped cross-section and a substantially cruciform cross-section.

12. The tree felling head according to claim 11, wherein the bottom saw housing comprises a peripheral side wall at least partially forming the peripheral border thereof, the tree felling head further comprising a lower blade guard mounted to or formed integral with a lower portion of the peripheral side wall and having a rear portion, the at least one excavating tooth being at least partially formed by the rear portion of the lower blade guard.

13. The tree felling head according to claim 11, wherein the bottom saw housing has an outer surface and the tree felling head further comprises at least one tooth-mounting flange protruding outwardly from the outer surface of the bottom saw housing and having a rear end, wherein the tree felling head comprises a tooth-mounting pad extending at least one of downwardly and outwardly from the rear end of the tooth-mounting flange, and wherein the excavating tooth comprises a housing-fastening sleeve removably engageable with the tooth-mounting pad.

14. The tree felling head according to claim 10, wherein the bottom saw housing comprises a peripheral side wall having an outer surface and wherein the excavating assembly comprises at least one excavating blade secured to a section of the outer surface of the peripheral side wall.

15. The tree felling head according to claim 14, wherein the excavating blade comprises a housing-mounting portion secured to the bottom saw housing and wherein the bottom saw housing further comprises at least one blade-mounting bracket protruding outwardly from the outer surface of the peripheral side wall, the at least one blade-mounting bracket having a blade-receiving surface, and wherein the at least one excavating blade is engaged with the blade-receiving surface.

16. A tree-cutting carrier, comprising:
A manipulator arm; and
A tree felling head according to claim 1, the tree feeling head being mounted to the manipulator arm.

17. A tree felling head for mounting to a tree-cutting carrier, the tree felling head comprising:
A substantially vertically extending frame;
At least one tree-manipulating arm mounted to the frame and extending forwardly therefrom;
A bottom saw housing mounted to a lower end of the frame, the bottom saw housing defining a saw-receiving cavity and comprising a peripheral side wall forming a peripheral border at least partially bordering the saw-receiving cavity;
A saw blade disk mounted to the lower end of the frame and at least partially received within the saw-receiving cavity of the bottom saw housing;
A lower blade guard mounted to a lower portion of the peripheral side wall of the bottom saw housing and substantially surrounding the saw blade disk and extending outwardly past a front-end portion of the saw blade disk; and
An excavating assembly comprising a housing-mounting portion fixedly secured to a rear portion of the bottom saw housing and a ground-digging portion extending outwardly past the peripheral border at least along a section thereof.

18. The tree felling head according to claim 17, wherein the excavating assembly comprises at least one excavating tooth comprising a tooth ground-digging portion forming at least partially the ground-digging portion of the excavating assembly, wherein the tooth ground-digging portion has one of a substantially T-shaped cross-section and a substantially cruciform cross-section.

19. The tree felling head according to claim 17, wherein the excavating assembly comprises at least one ground-digging blade secured to a section of an outer surface of the peripheral side wall.

20. The tree felling head according to claim 17, wherein the ground-digging portion comprises a free end extending at least one of outwardly and downwardly with respect to the section of the peripheral border and wherein the ground-digging portion is tapered with a thickness decreasing towards the free end.

* * * * *